(12) United States Patent
Abe et al.

(10) Patent No.: US 6,801,240 B2
(45) Date of Patent: Oct. 5, 2004

(54) INFORMATION RECORDING WITH EFFECTIVE PULSE CONTROL SCHEME

(75) Inventors: Michiharu Abe, Kanagawa (JP); Michiaki Shinotsuka, Kanagawa (JP); Kenya Yokoi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 181 days.

(21) Appl. No.: 10/119,193

(22) Filed: Apr. 10, 2002

(65) Prior Publication Data

US 2002/0196324 A1 Dec. 26, 2002

(30) Foreign Application Priority Data

| Apr. 12, 2001 | (JP) | ........................................ 2001-113459 |
| May 2, 2001 | (JP) | ........................................ 2001-135211 |
| Sep. 20, 2001 | (JP) | ........................................ 2001-287272 |

(51) Int. Cl.⁷ .................................................. B41J 2/47
(52) U.S. Cl. ....................................................... 347/252
(58) Field of Search ................................ 347/252, 247, 347/249, 251, 225, 237, 240, 239, 255, 143, 142, 112, 111, 144, 10, 5, 1

(56) References Cited

U.S. PATENT DOCUMENTS

| 4,829,499 | A | 5/1989 | Abe |
| 5,105,416 | A | 4/1992 | Segawa et al. |
| 5,226,031 | A | 7/1993 | Abe |
| 5,732,062 | A | 3/1998 | Yokoi et al. |
| 5,738,960 | A | 4/1998 | Abe |
| 5,738,973 | A | 4/1998 | Abe |
| 5,740,149 | A | 4/1998 | Iwasaki et al. |
| 5,750,293 | A | 5/1998 | Abe |
| 5,761,179 | A | 6/1998 | Iwasaki et al. |
| 5,784,355 | A | 7/1998 | Abe |
| 5,790,505 | A | 8/1998 | Abe et al. |
| 5,824,450 | A | 10/1998 | Abe |
| 6,426,929 | B1 | 7/2002 | Watabe et al. |
| 6,459,666 | B1 * | 10/2002 | Yokoi ...................... 369/47.15 |
| 6,487,149 | B1 | 11/2002 | Yokoi et al. |
| 6,600,712 | B1 | 7/2003 | Masui et al. |

FOREIGN PATENT DOCUMENTS

| JP | 08-221757 | 8/1996 |
| JP | 09-134525 | 5/1997 |
| JP | 2-899551 | 3/1999 |
| JP | 11-175976 | 7/1999 |

* cited by examiner

Primary Examiner—Raquel Yvette Gordon
(74) Attorney, Agent, or Firm—Dickstein Shapiro Morin & Oshinsky LLP

(57) ABSTRACT

An input bit sequence with predetermined bit periods T is converted into a corresponding light-emission waveform; and a beam with the thus-obtained light-emission waveform is applied onto a phase-change optical disk so as to record the input bit sequence thereon. The light-emission waveform comprises a heating pulse for heating the recording medium occurring for an interval tw and a cooling pulse for cooling the recording medium occurring for an interval tc, and the intervals tw and tc on the heating/cooling pulses satisfy the following requirement in case the heating/cooling pulses occur alternately with repetition: $1.5T \leq tw+tc \leq 3T$.

63 Claims, 22 Drawing Sheets

FIG.2A
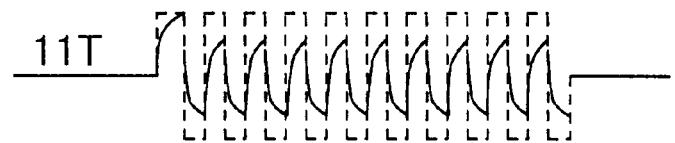
RECORD MARK
FIG.2B
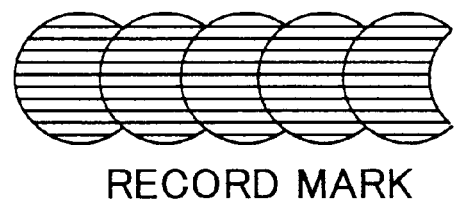
RECORD MARK

INFORMATION RECORDING WITH EFFECTIVE PULSE CONTROL SCHEME

BACKGROUND OF THE INVENTION

1. Field of the Invention

The present invention relates to an information recording method and an information recording device suitable for recording an optical mark on an optical disk, especially a phase-change optical disk using a heat applied by laser light irradiation.

2. Description of the Related Art

A method of recording information is known in which a hole is formed in a recording film by a thermal effect of optical energy of irradiated laser light, changing a crystal structure, or changing direction of magnetization, or deforming the recording film, or the like, and, thus, an optical mark is recorded on a recording medium.

Such a method is applied to an optical disk device or a magneto-optical disk device in recent years, and is put in practical use. In such a device, increase in recording density and increase in memory capacity are demanded, as an external information recording device for an information processing device, such as a computer.

As examples of this type of information recording method, or an information recording device, an information recording device disclosed in Japanese laid-open patent application No. 8-221757 (see Japanese patent No. 2899551) is known. There, in synchronization with a predetermined bit period T, a rate of heating/cooling of a phase-change recording medium is controlled by irradiating laser light in a form of an optical pulse for heating and an optical pulse for cooling alternately, and thereby, amorphous mark formation is made by sudden cooling while crystal formation is made by gradual cooling. Such a method may also be applied to information recording on CD-RW.

In this method, a recording length of the optical mark is controlled by changing a manner of repetition of the cooling pulses and heating pulses with bit period intervals. However, in case the predetermined bit period T becomes much shorter and becomes much higher bit rate of 10 nanoseconds or less, it becomes difficult to make a laser pulse to be emitted properly. The limit thereof is approximately 12 times the standard rate on CD.

Recently, a demand of increasing in recording speed has become stronger with technical progress on personal computers. Thereby, improvement in operation speed of a laser light source driving part and improvement in recording efficiency have been demanded. An information recording scheme for responding thereto is disclosed by Japanese laid-open patent application No. 9-134525.

In this scheme, a requirement of pulse light-emitting of a laser light source is eased as a result of heating/cooling pulses of periods of approximately 2T with respect to the bit period T being applied. However, as mark length is classified integrally, heating/cooling pulse may have a length of approximately 1.25T, or the like, and, thereby, it may not be possible to precisely emit light-emitting pulse at a time of some high-speed recording case.

Then, it is required for an information recording method and an information processing device to solve a problem that a mark having a predetermined length-cannot be precisely formed, or a problem that a load required for a laser light source driving part becomes large according to improvement in the recording speed.

Media only for reproduction (recording media) such as a CD for music, a CD-ROM, a DVD, and a DVD-R, an OM, and so forth are put in practical use with development in multimedia. Recently, a phase-change disk also attracts attention besides write-once optical disk employing coloring material, and rewritable MO disk using an optical magnetism material.

In this phase-change disk, a recording material is switched reversibly between a crystal phase and an amorphous phase, and, thus, information is recorded there. Furthermore, in the phase-change disk, reproduction is made only with laser light from a light source of a semiconductor laser and no external magnetic field is needed, unlike MO media, etc. Further, informational recording and erasing can be performed at once by laser light in the phase-change medium. The semiconductor laser is driven by a semiconductor laser driving circuit here.

Generally, a semiconductor laser light-emitting waveform of single pulse generated as a recording waveform for recording information on an information recording medium based on EFM (Eight Fourteen Modulation) code, etc. is used. In a case of using phase-change media, by this recording waveform, a record mark has a distortion in shape like a tear drop with an accumulated heat, or insufficient cooling speed, forming of an amorphous phase becomes inadequate, and there may cause problems that the thus-formed record mark has not a sufficient reflectance to laser light.

In order to solve the above-mentioned problem, forming of a mark on phase-change media is made by laser light of multi-pulse waveform, as shown in FIG. 1A, which includes recording power in many stages generated based on the EFM code, etc. A top heating pulse Htop on a mark part of this multi-pulse waveform fully carries out preliminary heating of the recording film of the phase-change medium more than a melting-point temperature. Then, following the top heating pulse Htop, a plurality of heating pulses Hmp occur, while cooling multi-pulses Cmp also occur between these heating pulses, respectively, as shown in the figure. Assuming that light-emitting power of the top heating pulse Htop is Phtop, a light-emitting power of the following heating pluses Hmp is Phmp, and a light-emitting power of the cooling pulses Cmp is Pcmp, setting is made such that:

$$Phtop = Phmp > Pcmp \approx Pr$$

An erasing part of this multi-pulse waveform includes an erasing pulse E, and a light-emitting power Pe thereof is set such as $$Phmp < Pe < Pcmp$$

Thus, by making a recording waveform into such a multi-pulse waveform, an amorphous phase is formed as a mark part by a condition of sudden cooling of heating ⇒ cooling. A crystal phase is formed by a condition of gentle cooling of only heating on the erase portion E. Thereby, a sufficient difference in reflectance can be created between the amorphous phase and crystal phase.

There are two information recording methods, i.e., a mark position (PPM) type and a mark edge (PWM) type. Recently, the mark edge type which can respond to high-density recording is used. In case information recording is performed on phase-change medium according to the mark edge type, a heating/cooling pulse having a length of 0.5T with respect to a recording channel clock period T is used.

That is, whenever the mark length of recording data increases by 1T, the light of the multi-pulse has 1 set of heating pulse and cooling pulse added thereto is used. FIG. 1A shows a typical example of recording waveform. Since this recording waveform can always record the record data of different mark length on a predetermined fixed heating/cooling condition, edge shift occurring depending on the mark length of record data can be effectively reduced. Moreover, in a case where high-speed recording is performed by this recording waveform, the recording channel clock frequency is made twice and 4 times, the-same rate at which the record line speed is increased. In this case, the basic number of pulses and the relation between levels of the recording power are maintained, and, the pulse width of the heating multi-pulses Hmp can be set variably in a range between 0.25T and 0.55T.

When recording information on phase-change media by the mark edge recording type is performed, it is important for phase-change media to perform heating sufficient and sudden cooling in a record mark formation portion so as to form[]edge parts front and rear of the mark clearly.

However, in the case where high-speed recording is performed with the recording waveform as it is, the recording channel clock frequency is made twice or 4 times, and, thereby, the heating pulse and cooling pulse have a reduced time interval each such that sufficient temperature increase and decrease required for phase change in the recording film may not be achieved. Moreover, the rate of the interval of the heating pulse with respect to the recording channel clock pulse T thus increases, and, thereby, a sufficient cooling time could not be secured, thus forming of a mark becomes inadequate, and recording of exact mark length may become impossible.

Specifically, in high-speed recording, when a rising-up interval and decaying-down interval in a semiconductor laser driving circuit become longer with respect to the recording channel clock pulse width T, as shown in FIG. 2A, the recording light-emitting waveform cannot reach predetermined lower level and upper level, and, thereby, it becomes impossible for phase-change media to perform thereon sufficient heating and sufficient cooling, and a problem may occur that a record mark becomes thin as shown in FIG. 2A. An RF signal obtained as a reproduction signal obtained in such a case having amplitude variation as the recording data length becomes longer, thus the mark length becoming extremely shorter. Therefore, at a time of high-speed recording, a high-speed response semiconductor laser driving circuit should be provided, and, thus, the circuit becomes large-scaled and requires a high cost.

According to Japanese laid-open patent application No. 9-134525, in a case where recording data of a mark length of any one of even number length and odd number length with respect to the recording channel clock period is recorded, the pulse width of a rear heating pulse and a rear cooling pulse has a time interval approximately same as the recording channel clock period.

According to this recording method, the substantial period of the multi-pulse sequence is set one half of the recording channel clock pulses, and, thus, it is possible to secure sufficient heating time and cooling time. However, the predetermined heating pulse width of the multi-pulse sequence is individually changed according to each mark data length, and, thus, control processing of pulse width should become complicated.

Moreover, in order to make drive of a recording energy generation source easier and to secure a sufficient cooling time for a recording medium, Japanese laid-open patent application No. 11-175976 discloses a method of driving an energy generating means so as to appropriately change the number of applying energy pulses within a mark formation interval according to a mark length so that an interval between arbitrary change points of the applied energy per unit time may become more than a detection window width or an approximately natural number of times the detection window width at a time of information recording.

This method is similar to that of Japanese laid-open patent application No. 9-134525, and, according thereto, the pulse width and the heating power level of the head heating pulse or the last heating pulse of a multi-pulse sequence is changed appropriately so that the energy for mark formation is controlled.

According to this method, formation of a highly precise mark is expected on a recording medium in which a mark is formed according to accumulated energy (heat mode) heating power as in a phase-change medium made of GeSbTe family. However, for a recording medium with which a formation position of a mark should be controlled by sudden cooling speed by the cooling pulse just subsequent to the heating pulse in a medium made of AgInSbTe family or so.

Moreover, a setup of pulse width of a multi-pulse sequence in high-speed recording is such that ratio of a heating pulse width Thmp with respect to the recording channel clock period T becomes larger, and, thereby, a mark part formed according to a sudden cooling requirement on cooling pulse becomes thinner. This phenomenon becomes remarkable as the ratio of heating pulse exceeds 0.55T, and, thus, this is a critical speed of high-speed recording.

On the other hand, FIG. 5A illustrates recording waveforms in which, whenever a mark length of record data increases 1T, light of multi-pulses adding 1 set of heating pulse and cooling pulse is used. Since the recording waveform enables recording of record data of different mark length on a fixed heating/cooling condition, edge shift occurring depending on the mark length of record data is avoided. Moreover, in case where high-speed recording is performed by this recording waveform, the recording channel clock frequency is made twice (×2), 3 times (×3), or 4 times (×4) same as the multiplication of the recording line speed, while the pulse width Thmp of heating multi-pulses Hmp is changed accordingly in a range between approximately 0.25T and 0.55T.

When recording information on phase-change media by the above-mentioned mark edge recording type is applied, it is important for the phase-change media to be heated sufficiently and cooled suddenly in a record mark formation portion so as to form the edge parts before and after the mark clearly, as mentioned above.

When recording in a predetermined range of recording speed, a basic recording waveform remains as it is, while the recording channel clock frequency is multiplied in a range between 4 times and 10 times as for CD-RW. Thus, since this frequency is multiplied in the same multiplication rate as the recording line speed, the time interval of the optimum heating pulse and cooling pulse varies for a very wide range. As a result, it becomes difficult to obtain a final temperature and cooling speed required for phase change of the recording film, and, thus, the range of recording speed is limited thereby.

That is, at a time of low-speed recording, the ratio of heating pulse interval with respect to the recording channel clock signal period T is reduced, and, thereby, balance between heating period and cooling period becomes degraded. Thereby, mark formation cannot be performed properly, and, thus, it becomes not possible to secure accurate mark lengths More specifically, a sufficient heating energy can be applied even when the ratio of the heating pulse interval with respect to the period T of the recording channel clock signal is 0.20T or less. Accordingly, as shown in FIG. 5A, the heating pulse width is fixed as the recording frequency is lowered. Thereby, however, the cooling pulse width becomes more than 0.8T, which is too long to perform accurate mark formation. In other words, as the cooling pulse width becomes too long, proper cooling requirement cannot be satisfied, and, thus, a resulting record mark becomes thinner, as shown in FIG. 5A. Accordingly, a reproduction signal, i.e., an RF signal obtained from such a thin mark has amplitude vibration occurring therein, and, thereby, a substantial mark length becomes too short, as the recording data length becomes longer in this condition.

Therefore, at a time of low-speed recording, each pulse width of the heating multi-pulses is made not to be reduced from the order of 0.25T so as to keep a fixed duty ratio, and, thereby, it becomes necessary to control heating power so as to keep a proper heating energy.

According to the above-mentioned method disclosed by Japanese laid-open patent application No. 9-134525, as the pulse width of the last heating pulse is made equal to the recording channel clock period, the heating energy defined by the heating pulse width becomes excessive in case of low-speed recording, and, thereby, degradation of recording film of the medium may occur.

SUMMARY OF THE INVENTION

Accordingly, it is demanded to obtain a predetermined record mark length by easy pulse control, by securing a sufficient heating time and cooling time, without needing a light source drive part to have higher operation speed performance, and to provide an information recording method which can perform high-speed recording exceeding the recording speed range of the conventional recording medium.

In detail, it is demanded to enable controlling of an edge position after a record mark with high precision by a cooling pulse at the tail end, and an erasing pulse just behind it, in order to achieve high-speed recording on a basis of making a substantial interval of a heating pulse and a cooling pulse in a multi-pulse sequence longer than a recording channel clock period, and securing sufficient heating time and cooling time, without changing each heating pulse of the multi-pulse sequence.

Moreover, in order to enable control of a rear edge position on each record mark length, the pulse width of the last cooling pulse is made to have a short interval or a long interval selectively for two mark data lengths in which the number of heating pulses and the number of cooling pulses becomes identical.

Furthermore, in order to enable control the rear edge position on each record mark length, the ratio of each erase power of the erase pulse positioned immediately behind the last cooling pulse should be made different.

Moreover, recording at high speed also for an information recording medium applying a conventional multi-pulse sequence should be made possible.

Furthermore, high-speed recording onto an information recording medium applying a multi-pulse sequence conventional is made possible with a simple and low-cost additional circuit configuration.

Furthermore, in addition to an information recording method applying a conventional multi-pulse sequence in an ordinary recording speed set up for an information recording medium, an information recording method for recording at higher speed is realized with a simple and low-cost additional circuit.

Further, according to another aspect of the present invention, it is possible to secure sufficient heating time and cooling time, and, also, obtain a predetermined record mark length by simple change of configuration of multi-pulse sequence, through simple pulse control. Furthermore, it is possible to provide information recording scheme which enables information recording at a lower speed in comparison to the recording speed range on the conventional information recording media.

More specifically, in order to make the substantial period of heating pulse and cooling pulse in multi-pulse sequence shorter than the recording channel clock period and to improve the balance between heating time and cooling time, the number of multi-pulses which suits the information recording medium is increased, and thus it is enabled to form a proper mark, without changing each heating pulse of multi-pulse sequence irregularly.

Moreover, in order to obtain the multi-pulse sequence which can widen a recordable range of recording speed on a recording medium to a lower speed range, the number of heating pulse and cooling pulse is made increase by two sets thereof whenever the mark data length increases 1T in case low-speed recording than the predetermined range, and also, the heating pulse width would be otherwise set much smaller than a predetermined pulse width.

Furthermore, the recording requirement on the low speed recording can be set easily in a recording device.

Furthermore, low-speed recording onto an information recording medium applying a multi-pulse sequence conventional is made possible with a simple and low-cost additional circuit.

Furthermore, in addition to an information recording method applying a conventional multi-pulse sequence in an ordinary recording speed set up for an information recording medium, an information recording method for recording at lower speed is realized with a simple and low-cost additional circuit.

In order to achieve the above-mentioned objects, according to the present invention, heating/cooling pulses are made to have pulse widths longer with respect to the period of recording channel clock signal in case of high-speed recording. Thereby, even when response of laser source drive device is not superior enough, substantially high-speed recording can be achieved with a simple configuration at low cost. Furthermore, by widening the pulse widths of the recording pulses of laser beam, it is possible to avoid thermal interference between adjacent record marks.

Furthermore, it is preferable that the pulse widths of heating/cooling pulses are narrower than those of the top pulses. Thereby, the pulses other than top ones are narrowed so that record unevenness in the intermediate part of the record mark can be avoided, while the top pulses which cannot receive residual heat of preceding heating pulse are widened.

Furthermore, the ratio of heating pulse width should be adjusted appropriately so that heating power should not be made much higher while sufficient cooling speed can be secured.

Furthermore, by appropriately combining various predetermined widths of heating/cooling pulse pairs, various mark data lengths can be easily created.

According to another aspect of the present invention, for a higher-speed recording mode, i.e., the recording channel clock frequency is higher, the period of heating/cooling pulses should be widened with respect to the recording channel clock period. Thereby, it is possible to secure necessary heating energy and cooling speed for creating phase change in a phase-change recording medium even in case of high-speed recording mode.

Furthermore, by appropriately controlling the pulse width of the last cooling pulse, and/or erase power of erase pulse immediately subsequent to the last cooling pulse, it is possible to create different mark data lengths even using the same number of heating/cooling pulses. Accordingly, merely with a simple configuration modification, high-accuracy mark data length creation at high-speed recording can be achieved.

Furthermore, according to another aspect of the present invention, in case of low-speed recording, by increasing the number of heating/cooling pulses, it is possible to easily create a satisfactory record mark also in case of low-speed recording.

BRIEF DESCRIPTION OF THE DRAWINGS

Other objects and further features of the present invention will become more apparent from the following detailed description when read in conjunction with the following accompanying drawings:

FIGS. 2A and 2B illustrate problematic situation of rising edge and decaying edge of light-emission waveform in case of high-speed recording and situation of resulting recording marks;

DETAILED DESCRIPTION OF THE PREFERRED EMBODIMENTS

Figure 6:
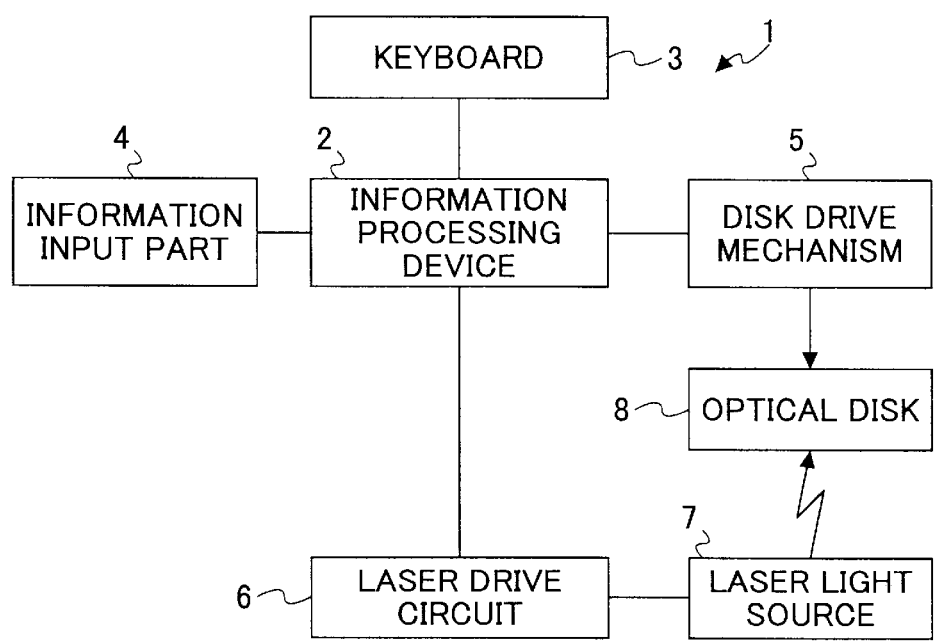
FIG. 6 illustrates a block diagram of another embodiment of the present invention.

A first embodiment of the present invention will now be described with reference to FIGS. 6, 7 and 8. An information recording device 1 in the first embodiment is applied to a personal computer with a CD-RW drive built therein, for example. For this reason, this information recording device 1 has an information processing device 2 which includes a main part of a personal computer, as shown in FIG. 6, a keyboard 3, an information input part 4, a disk drive mechanism (CD-RW drive) 5, and a laser drive circuit 6 which are connected to this information processing device 2, and a laser light source 7 which is connected to the laser drive circuit 6.

Many successive binary bits each of "1" or "0" are input to the information input part 4 at a predetermined bit period T as a time-series information. The information processing device 2 controls the disk drive mechanism 5 and the laser drive circuit 6 according to this time-series information, when this information is input into the information input part 4 from the outside. This laser drive circuit 6 follows this control, and drives the laser light source 7 so as to perform modulation control of light-emission power of laser light of the laser light source 7 made of a semiconductor laser. A laser light source control unit to perform the control which will be described later is formed of this laser drive circuit 6 and information processing device 2. The disk drive mechanism 5 drives so as to rotate an optical disk (optical information recording medium) in phase-change type and the laser light of the laser light source 7 is applied thereonto.

According to the information recording device 1 in the first embodiment, code data of a CD-ROM format is overwritten to the optical disk 8 of phase-change recording medium according to the above-mentioned mark edge recording scheme using EFM code.

Figure 8:
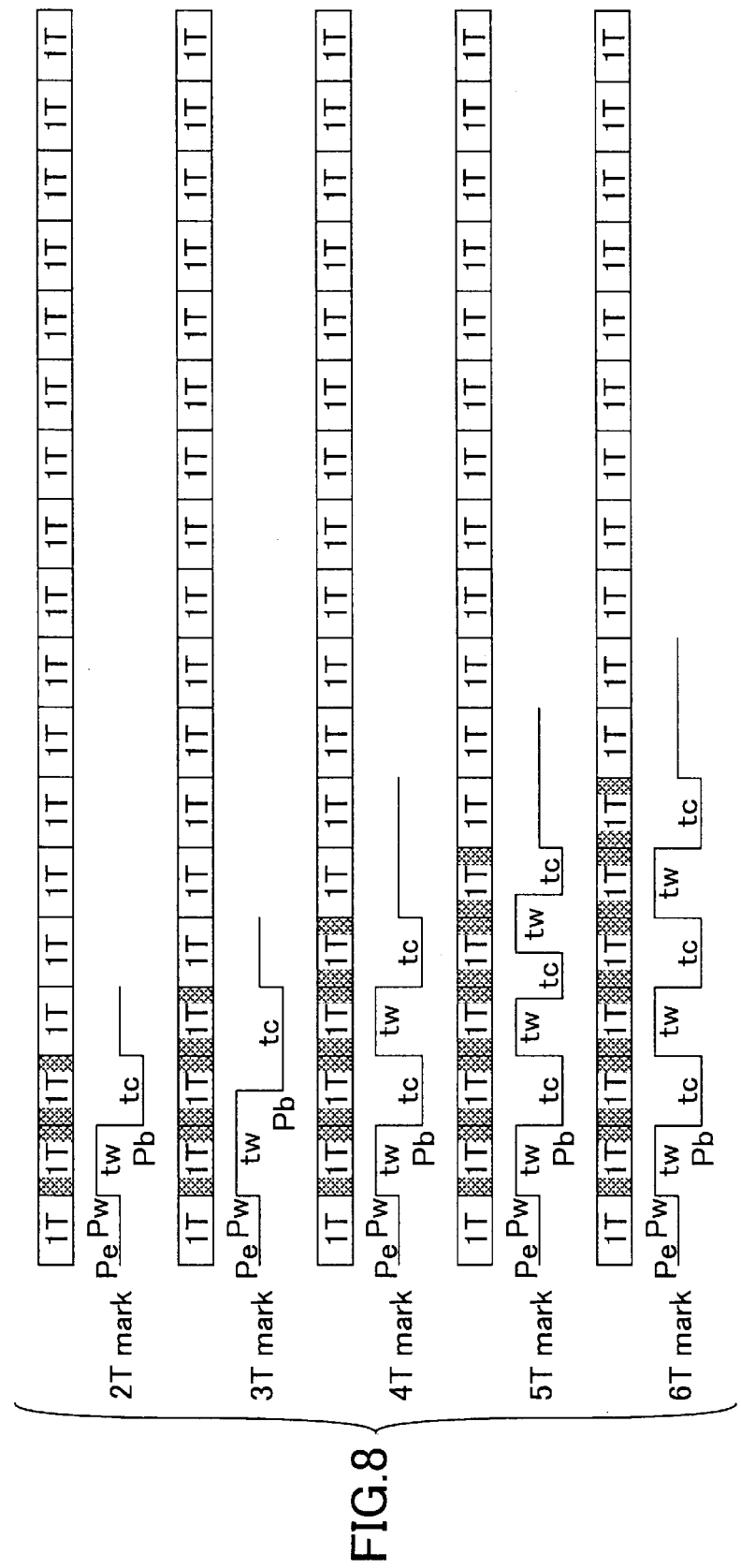
FIGS. 8 through 12 illustrate recording strategies according to the present invention in the embodiment shown in FIGS. 6 and 7.

At a time of recording to an optical disk 8, by generating a pulse control signal based on EFM code data in the information-processing device 2, and making the laser light source 7 drive by a driving current according to the pulse control signal of the laser drive circuit 6, pulse light as shown in FIG. 8 is made to be emitted, a record mark is formed by making laser light to be applied to the optical disk 8 driven and rotated, and thus, information is recorded thereon. At a time of reproduction, the laser light source 7 is driven by the laser drive circuit 6, light is made to be emitted thereby at a reproduction power, the laser light is then applied onto the optical disk 8, and a reproduction signal is acquired from carrying out photoelectric conversion of the reflected light by a photoelectric device having passed through an optical system.

The laser light of multi-pulses emitted by the laser light source 7 at a time of recording takes either a state of heating/cooling pulses for mark recording which include heating pulses of high power level Pw, and cooling pulses of low power Pc, or a state of erase pulses for the purpose of un-marking (with no change) not forming mark or erasing (conversion into un-mark) marks of an intermediate power Pe. The scheme of driving the laser light source 7 at these three power levels is well-known from the above-mentioned two Japanese patent publications, and so forth.

Figure 7:
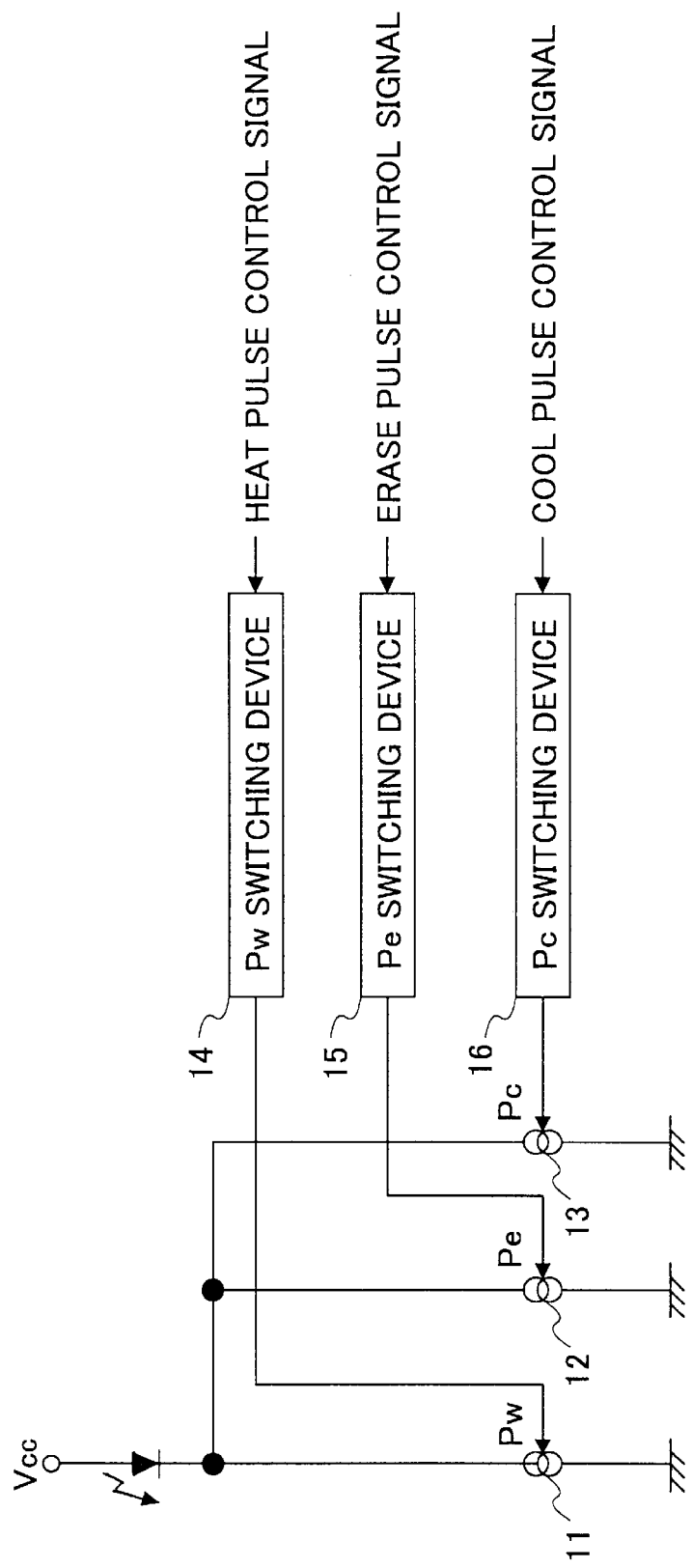
FIG. 7 illustrates a circuit diagram of a laser driving circuit shown in FIG. 6.

In order to emit light at such three power levels, the laser drive circuit 6 is configured as shown in FIG. 7. Namely, a constant current source 11 which provides a driving current for making light emit at the power level Pw to the laser light source 7, a constant current source 12 which provides the driving current for making light emit at the power level Pe, and a constant current source 13 which provides a driving current for making light emit at the power level Pc are connected in parallel, and also, switching devices 14, 15, and 16 which carry out switching control to selectively provide the driving current to each of the constant current sources 11, 12, and 13 based on the pulse control signal from information processing device 2 are connected.

A recording strategy according to the first embodiment of the present invention will now be described with reference to FIG. 8. The upper of FIG. 8 shows an example of input data bit sequence at a predetermined bit period T, and shows a state of two values by existence/absence of halftone in the figure (halftone part denotes the value "1" while and non-halftone part denotes the value "0"). Under the circumstances, when the length of a record mark becomes too smaller compared with the size of the optical beam for record, since recording tends to become unstable, a data placement rule should be applied such that bits of a same value continues 2T, 3T or more periods.

According to the present embodiment applying this data placement rule, when recording is made by one or a plurality of sets of heating and cooling pulses Pw and Pc during intervals of tw and tc, respectively, successively, as shown in FIG. 8, a recording strategy is set up such that laser light by the heating/cooling pulses which satisfies the following formula be applied to the optical disk 8:

$1.5T = tw+tc \leq 3T$ $0.2 \leq tw/(tw+tc) \leq 0.8$

In the example shown in FIG. 8, the following setting is made:

| Mark length | tw + tc | tw/(tw + tc) |
|---|---|---|
| 2T | 2T | 0.5 |
| 3T | 3T | 0.5 |
| 4T | 2T, 2T | 0.5, 0.5 |
| 5T | 2T, 1.5T, 1.5T | 0.5, 0.5, 0.5 |
| 6T | 2T, 2T, 2T | 0.5, 0.5, 0.5 |

According to the present embodiment, light-emission operation is made such that the heating/cooling pulse period tw+tc is set to be within the range between 1.5T and 3T while the ratio of the heating pulse width with respect to the period tw/(tw+tc) is set to be within the range between 0.2 and 0.8. Thereby, requirements to the laser light source 7 are eased 1.5 or more times, and it comes to be able to perform high-speed recording easily compared with the conventional heating/cooling pulse having the period of 1T. Moreover, since the high-speed recording is enabled holding the effect which prevents the thermal interference between adjacent marks as a result of the requirement of $1.5T \leq tw+tc \leq 3T$ being satisfied, recording suitable to the property of the optical disk 8 can be attained.

Moreover, since $0.2 \leq tw/(tw+tc) \leq 0.8$, the driving requirements on the laser light source 7 which emits light can be eased also at this point. That is, the heating/cooling pulses includes a heating pulse occurring for tw and cooling pulse occurring for tc, and, by controlling the ratio of tw/(tw+tc), the balance between heating time and cooling time can be adjusted and thereby, it can be optimized according to the sensitivity, response, or the like of the recording medium, and also, the emitable power and/or response of the recording device.

In fact, when this ratio is made much smaller, in order to apply sufficient record energy, almost in inverse proportion to tw, higher record power is needed. On the other hand, when the ratio is enlarged, it may become hard to secure the cooling speed required for especially phase-change recording scheme. Therefore, the desirable range is $0.2 \leq tw/(tw+tc) \leq 0.8$, and, when it is optimized into approximately 0.5, heating and cooling can be balanced, recording power can also be saved, a demand to the response at the time of recording power modulation can also be eased, and as a result, practically desirable practical conditions are obtained.

In the case where tw+tc is 3T on the other hand, the heating pulse has the width of 0.6T even when tw/(tw+tc)=0.2. Accordingly, it can be understood that as the value of tw+tc is larger, it is possible to widen the variable range of the ratio tw/(tw+tc). In case the tw+tc=1.5T, the minimum, it is possible to ease the requirements to the response in case of recording power modulation as the variable range is narrowed.

Thus, even when the response of the optical pulse for recording is late, since recording using recording pulses (heating and cooling pulses) occurs relatively long interval compared with length T of the recording data bit so as to secure necessary heat energy and cooling speed, 1.5 times or twice higher-speed recording can be attained.

In addition, the above-mentioned requirement of the-period of tw+tc within the range between 1.5T and 3T should not be necessarily satisfied. Alliteratively, it is also possible that, other than the top heating/cooling pulses, the above-mentioned range may be between 1.5T and 2T. That is, $1.5T \leq tw+tc \leq 2T$ That is, the top heating/cooling pulses which cannot easily receive influence of remaining heat from the preceding heating pulse thus needs a larger energy. Accordingly, energy shortage on the top pulses should be avoided so that the requirement that $1.5T \leq tw+tc \leq 3T$. However, for the subsequent pulses, by controlling the requirement such that the period of tw+tc between 1.5T and 2T, unevenness of recording in the middle portion of a long mark can be lessened effectively.

Furthermore, according to the present embodiment, in consideration of the phase-change medium applied as the optical disk, application of erase power Pe having the power level between the heating power Pw and cooling power Pc is applied continuously during an interval in which no mark is formed. Thereby, gradual heating and gradual cooling of the phase-change recording film are performed on the optical disk 8, and, thereby, crystallization is prompted there. Thus, the surface of the disk is made into a condition in which reflectivity is high, in comparison to a portion of amorphous phase created by sudden cooling having low reflectivity. Thereby, high contrast phase-change recording can be achieved.

A second embodiment of the present invention will now be described with reference to FIG. 9. The same portion as the portion shown on the first embodiment is shown using the same reference numeral, and description thereof is omitted (similarly on the subsequent third and fourth embodiments).

According to the second embodiment, other than the top heating/cooling pulses, the period of heating/cooling pulses tw+tc is set any one of 1.5T, 1.75T, and 2T. Thereby, by combining a plurality thereof appropriately, it is easy to form a predetermined record mark.

Figure 9:
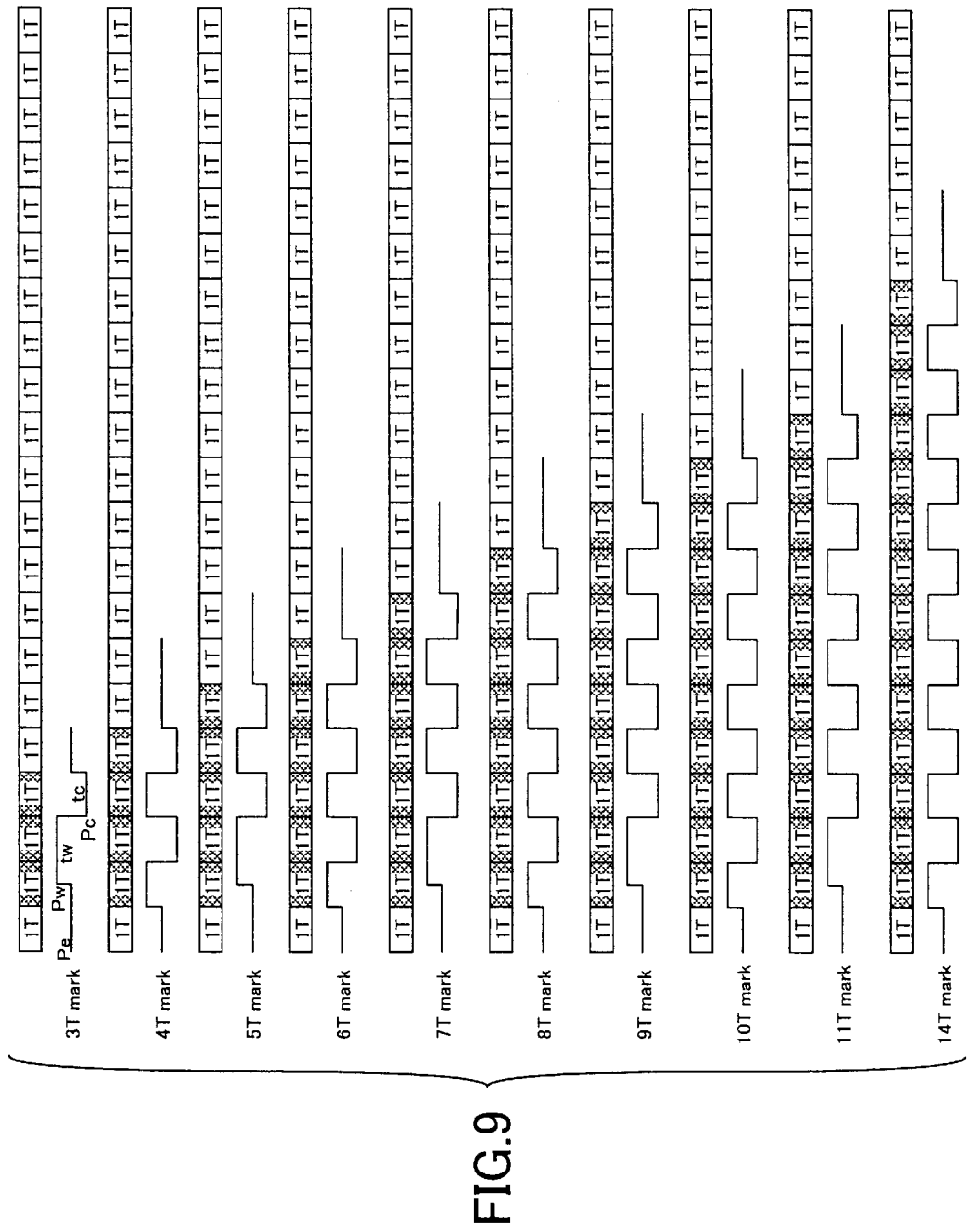

In the example shown in FIG. 9, the following setting is made:

| Mark length | tw + tc | tw/(tw + tc) |
|---|---|---|
| 3T | 2.5T | 0.6 |
| 4T | 2T, 2T | 0.5, 0.5 |
| 5T | 2.5T, 2T | 0.6, 0.5 |
| 6T | 2T, 2T, 2T | 0.5, 0.5, 0.5 |
| 7T | 2.5T, 2T, 2T | 0.6, 0.5, 0.5 |
| 8T | 2T, 2T, 2T, 2T | 0.5, 0.5. 0.5, 0.5 |
| 9T | 2.5T, 2T, 2T, 2T | 0.6, 0.5. 0.5, 0.5 |
| 10T | 2T, 2T, 2T, 2T, 2T | 0.5, 0.5. 0.5, 0.5, 0.5 |
| 11T | 2.5T, 2T, 2T, 2T, 2T | 0.6, 0.5, 0.5, 0.5, 0.5 |
| ... | | |
| 14T | 2T, 2T, 2T, 2T, 2T, 2T, 2T | 0.5, 0.5, 0.5, 0.5, 0.5, 0.5, 0.5 |

Thus, according to the present embodiment, for respective mark lengths, setting can be easily made by simply combining heating/cooling pulse pairs each pair having the period tw+tc as being 1.5T, 1.75T, or 2T (2T in the example of FIG. 9) as a component having a fixed length. Especially, in the example shown in FIG. 9, the top heating/cooling pulse pair has the period 2.5T only for marks which have the length of odd numbers of the bit periods T, such as those of the record mark lengths 3T, 5T, 7T, . . . , while, for the other marks, each of all the periods tw+tc of heating/cooling pulse pairs is the same 2T. Accordingly, each mark can be formed by a very regular combination.

A third embodiment of the present invention will now be described. According to this embodiment, a limitation is made such that the sum total length of combined pairs of heating and cooling pulses may be set to be within a range between (nT−1.5T) and (nT+05T) for a record mark of nT, where 'n' denotes an integer more than 2.

Thereby, the length of record mark does not shift from a predetermined length by a limited range of the sum total length of the combined pairs of heating and cooling pulses. Moreover, distortion between record marks can also be corrected by selecting a combination of recording pulses. Moreover, since a record mark is recorded in many cases somewhat longer than the total length (widths) of recording pulses, it can be correctly adjusted to the predetermined length actually recorded as a result of adjustment being made within the range according to the present embodiment.

Figure 10:
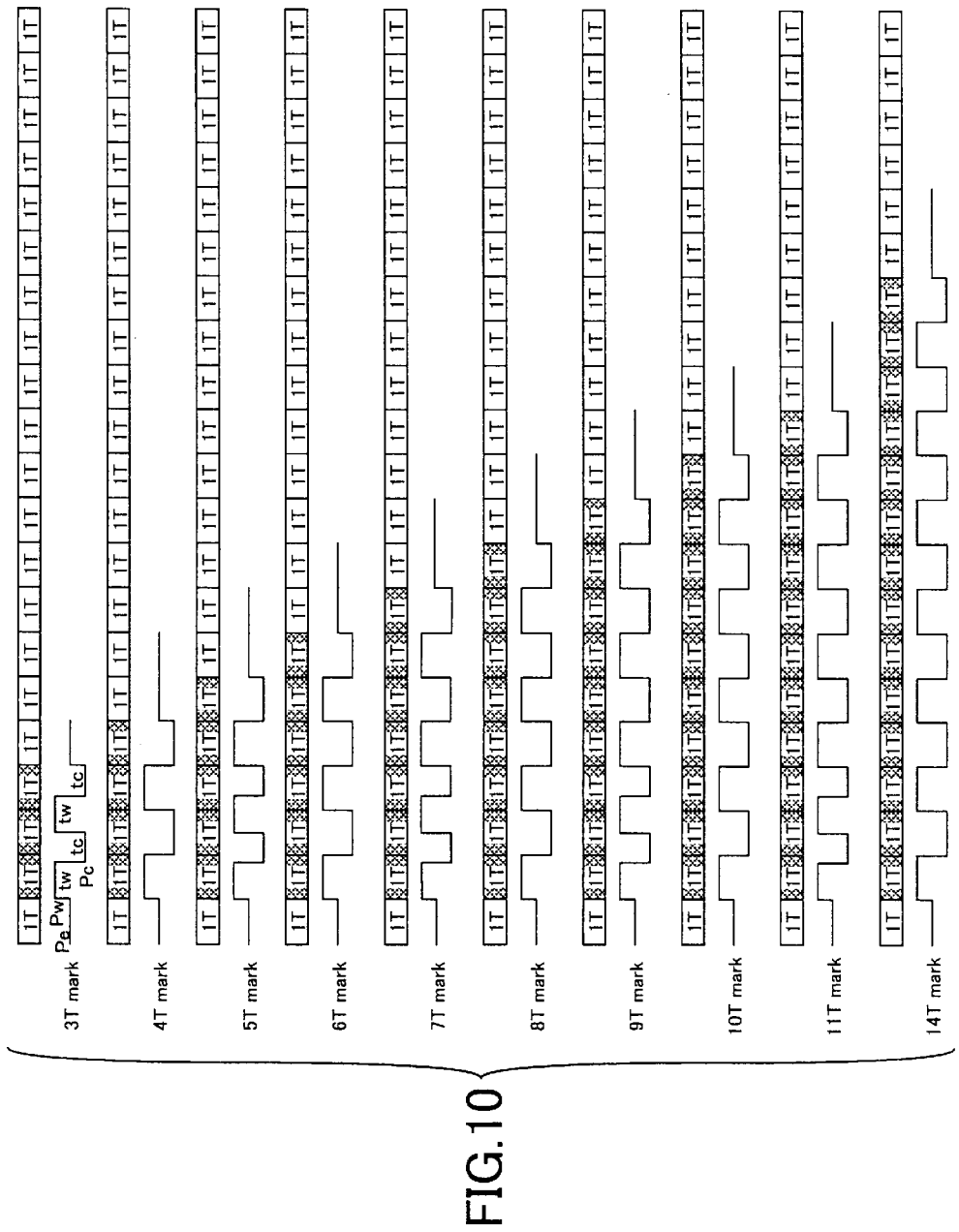

An example made in agreement between the length of the mark which should be recorded and the sum total length of the heating and cooling pulse pairs combined in each of all length types is shown in FIG. 10. Especially, the example shown in the figure corresponds to the example according to the second embodiment, and, it can be seen that the length of record mark can be set up correctly according to the second embodiment.

In the example shown in FIG. 10, the following setting is made:

| Mark length | tw + tc | tw/(tw + tc) |
|---|---|---|
| 3T | 1.5T, 1.5T | 0.5, 0.5 |
| 4T | 2T, 2T | 0.5, 0.5 |
| 5T | 1.5T, 1.5T, 2T | 0.5, 0.5, 0.5 |
| 6T | 2T, 2T, 2T | 0.5, 0.5, 0.5 |
| 7T | 1.5T, 1.5T, 2T, 2T | 0.5, 0.5, 0.5, 0.5 |
| 8T | 2T, 2T, 2T, 2T | 0.5, 0.5, 0.5, 0.5 |
| 9T | 1.5, 1.5, 2T, 2T, 2T | 0.5, 0.5, 0.5, 0.5, 0.5 |
| 10T | 2T, 2T, 2T, 2T, 2T | 0.5, 0.5, 0.5, 0.5, 0.5 |
| 11T | 1.5T, 1.5T, 2T, 2T, 2T, 2T | 0.5, 0.5, 0.5, 0.5, 0.5, 0.5 |
| ... | | |
| 14T | 2T, 2T, 2T, 2T, 2T, 2T, 2T | 0.5, 0.5, 0.5, 0.5, 0.5, 0.5, 0.5 |

A fourth embodiment of the present invention will now be described with reference to FIGS. 11 and 12. According to the present embodiment, regardless of the specified length of each record mark, respective setting values on the top heating/cooling pulses and last heating/cooling pulses are fixed.

That is, as each setting value of the top and last heating/cooling pulses which are very likely to influence the total length of the record mark actually formed is made fixed the positions of both ends of each mark are made correctly defined, and, thus, it is possible to effectively reduce jitter on recording/reproducing, and, thereby, better recording can be attained.

Figure 11:
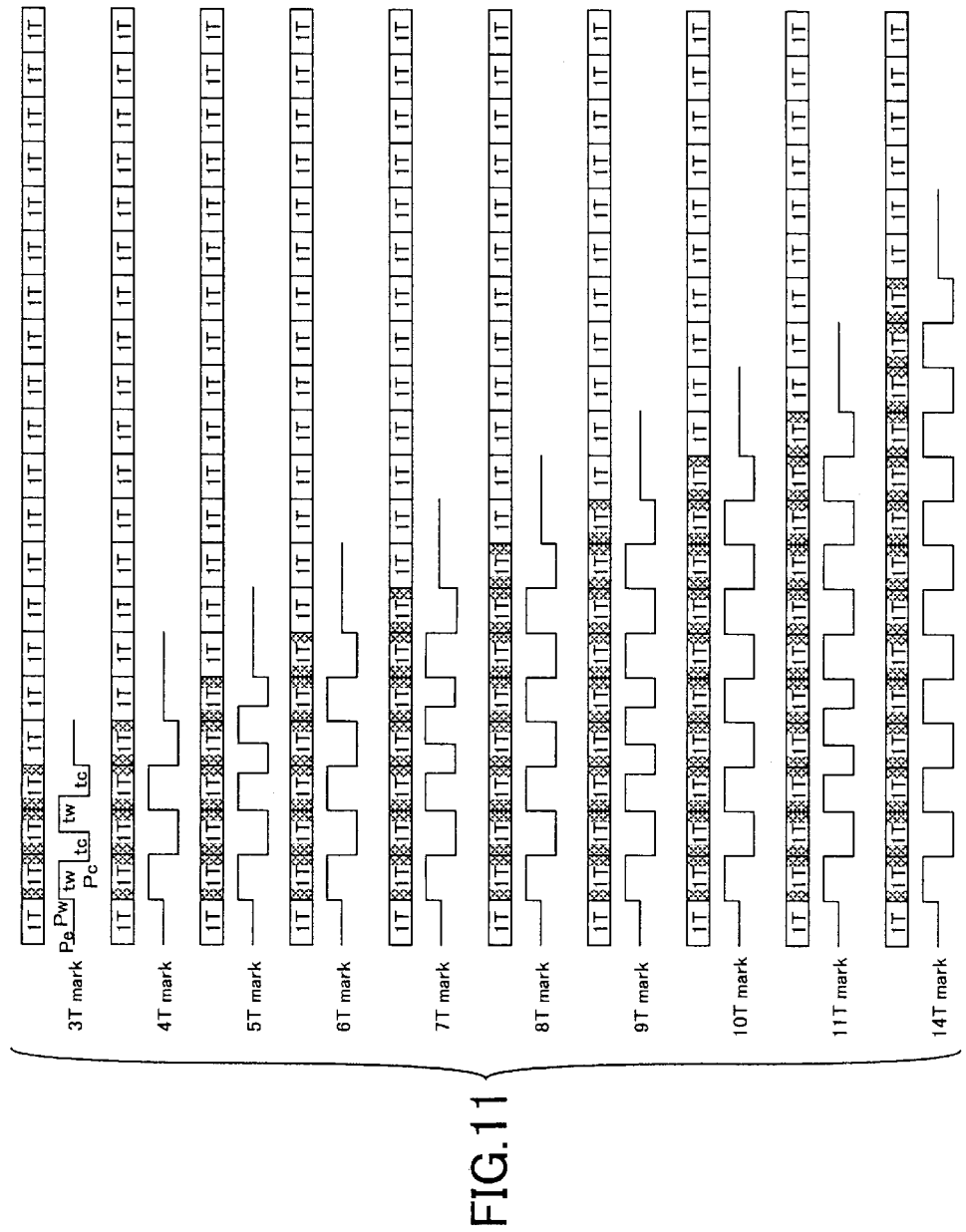

FIG. 11 shows an example where, for the top part and the last part of each mark length, the heating/cooling pulses of period 2T are disposed except the mark lengths of 3T and 5T.

Fit. 12 shows another example where the top part is placed with the heating/cooling pulses of period 2T, and the last part is placed with the heating/cooling pulses of period 1.5T, except for some exceptions.

Figure 12:
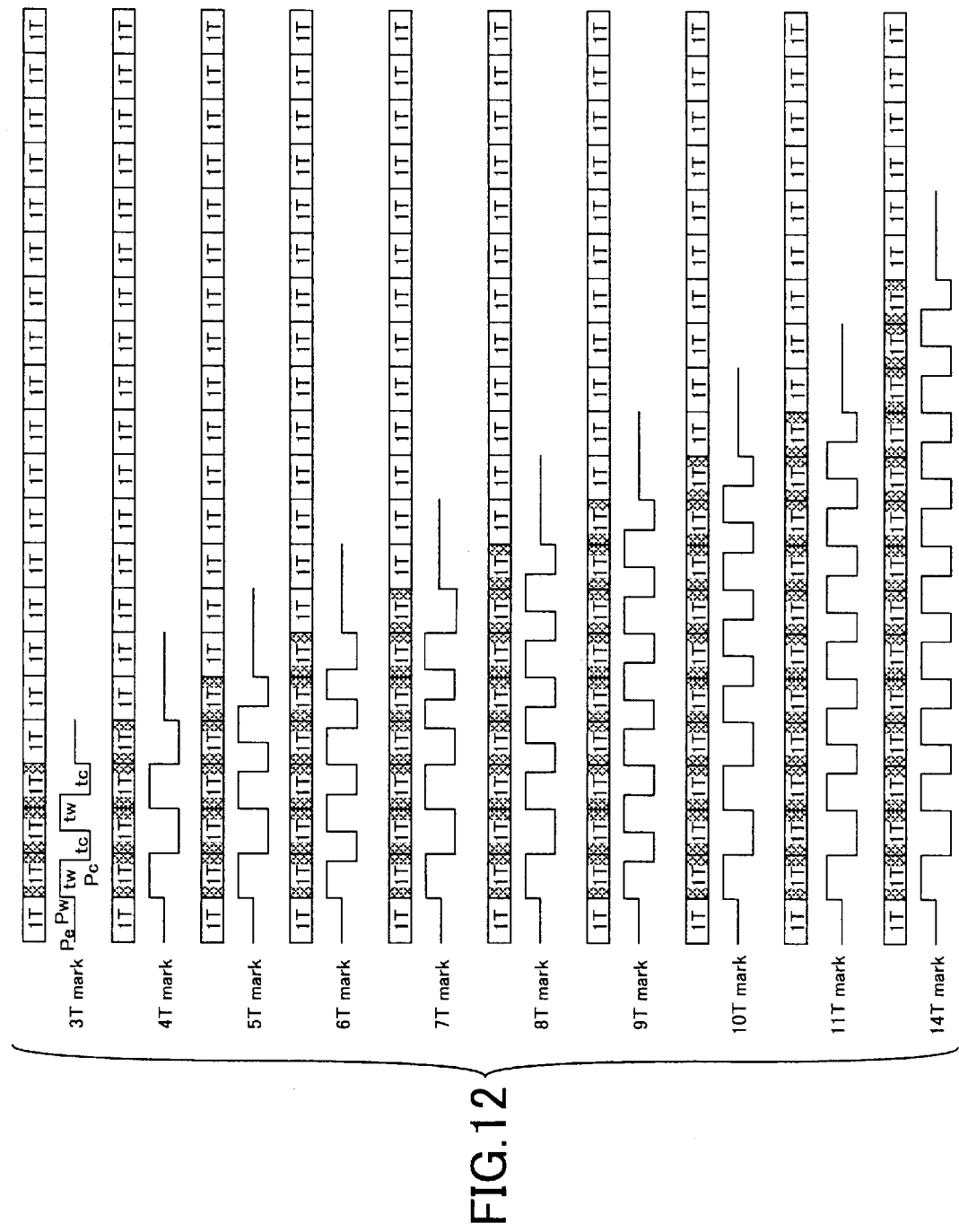

In addition, by allowing adjustment on each setting value on the top part and last part of each combination of pairs of heating/cooling pulses, freely with respect to normal setting, and a different setup is enabled among combinations of pairs of heating/cooling pulses, as shown in part of FIG. 12, and, thus, difference in property of particular recording medium of the optical disk 8 can be appropriately coped with. In the example shown in FIG. 12, the top heating/cooling pulses and last heating/cooling pulses of 3T mark, the top heating/cooling pulses of 6T mark and the top heating/cooling pulses of 9T mark are set in a manner different from usual setup.

According to the fourth embodiment, even in a case where the positions of mark end parts would be otherwise deviated (mark end shift) due to difference in property of particular recording media, by appropriately adjusting the respective setting values on the top and last end parts of the sequence of combination of heating/cooling pulse pairs according to the property of relevant recording medium, it is possible to cope with variation between different recording media, and, thus, to perform satisfactory recording even on different recording media.

Figure 14:
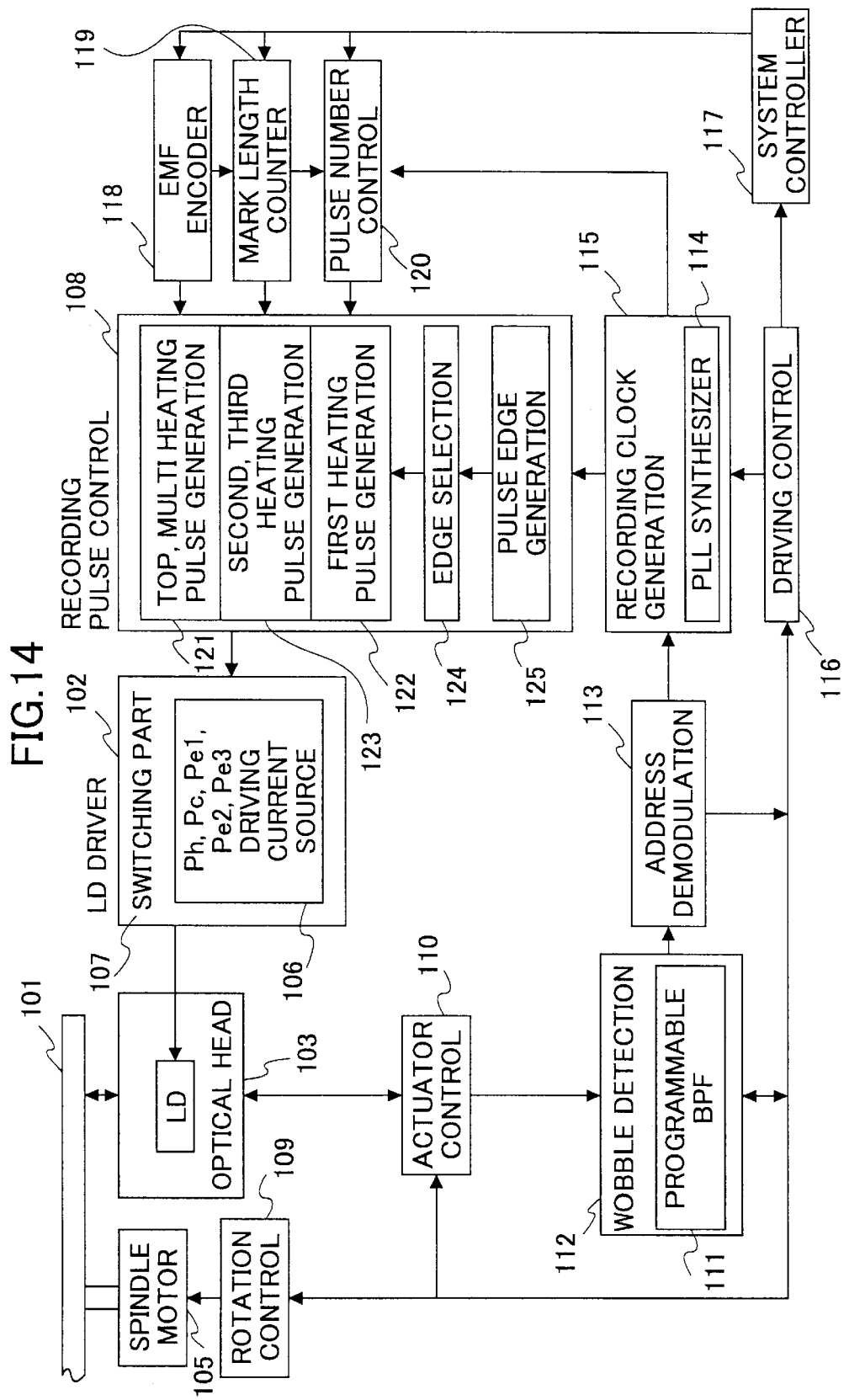
FIG. 14 shows a block diagram of an information recording device in the embodiment of the present invention illustrated with reference to FIGS. 1B and 3.

A fifth embodiment of the present invention will now be described. FIG. 14 shows an example of a configuration of an information recording/reproducing device according to the fifth embodiment of the present invention. This device records (overwrites) code data of CD-ROM format on a phase-change optical disk 101 which is an information recording medium, and performs mark edge (PWM) recording using EFM or EFM plus code (generally called EFM family code).

This information recording/reproducing device generates a pulse control signal based on a recording channel clock signal and EFM data at a time of recording. A semiconductor laser drive circuit (LD driver part) 102 drives a semiconductor laser (LD) 104 of an optical head 103 with a driving current according to the pulse control signal, and thus, causes the light source to emit a light-emission waveform of multi-pulse sequence, as shown in FIG. 1B.

Information is thus recorded onto the phase-change optical disk 101 driven and rotted by a spindle motor 105, while light of the light-emission waveform of multi-pulse sequence from the semiconductor laser LD 104 is applied to the phase-change recording layer of the phase-change optical disk 101 through an optical system (not shown) with the optical head 103, and thus, record marks are formed onto the phase-change optical disk 101.

At a time of reproduction, this information recording/reproducing device drives the semiconductor laser LD 104 by the LD driver part 102, which is thus made to emit light at reproduction power (read power), the light of the reproduction power from the semiconductor laser LD 104 is applied through the optical system onto the phase-change optical disk 101 with the optical head 103. Thus, a reproduction signal is obtained through reception of reflected light with a photoelectric device (not shown) through the optical system, and through photoelectric conversion.

Figure 1A:
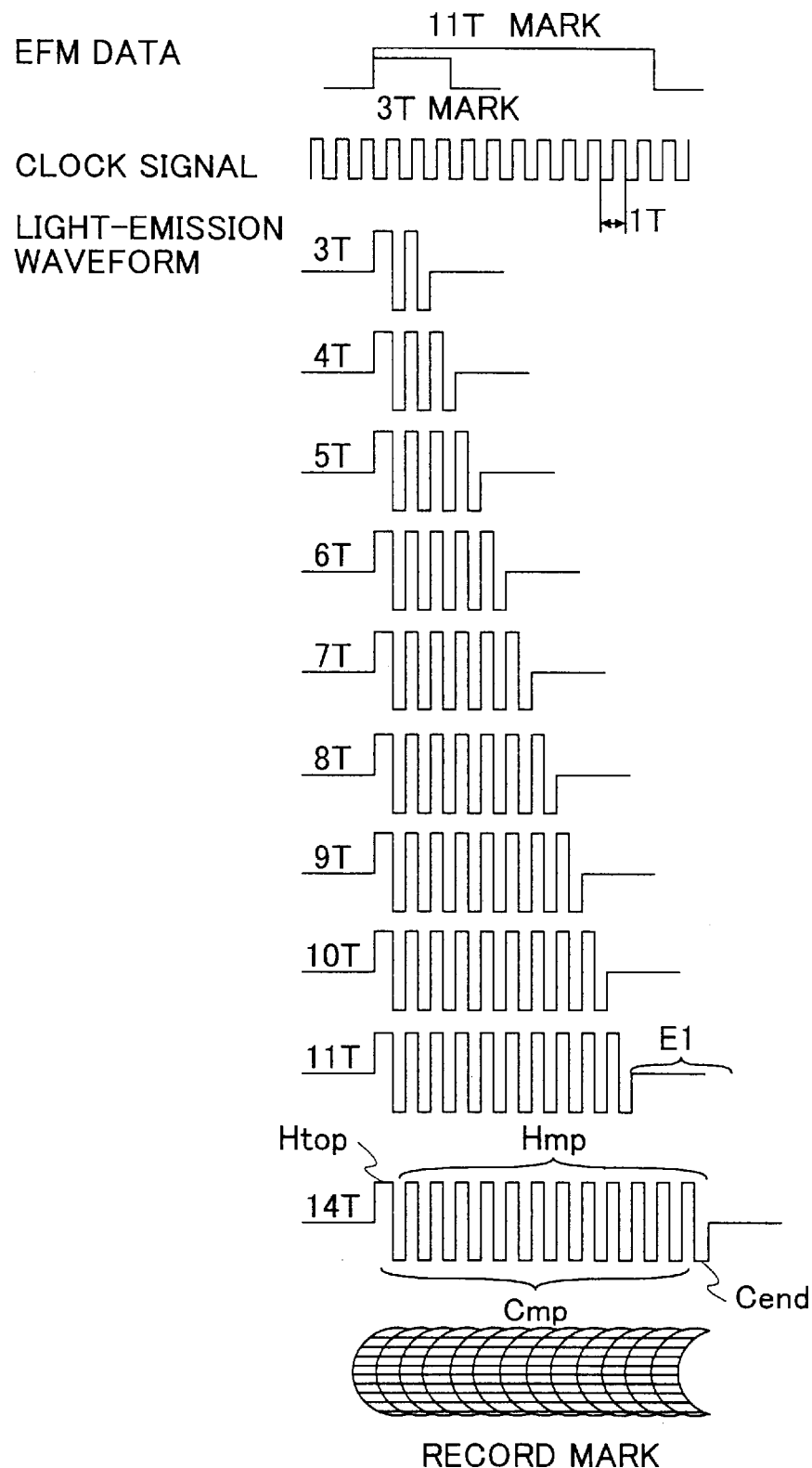
FIG. 1A illustrates light-emission waveforms according to the related art in case of high-speed recording.
Figure 1B:
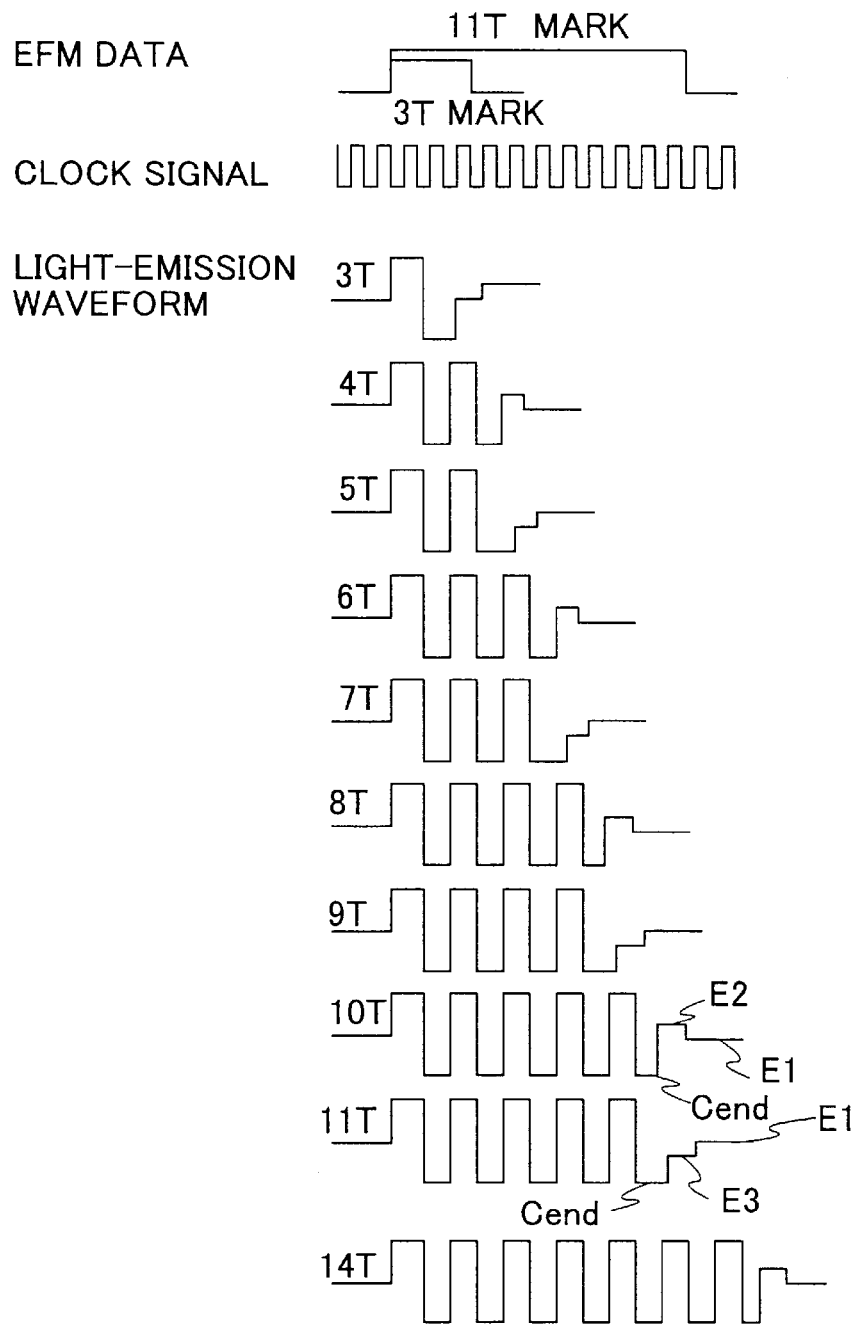
FIG. 1B illustrates light-emission waveforms according to one embodiment of the present invention in case of high-speed recording requirement same as that shown in FIG. 1A.

The light of the light-emission waveform of multi-pulse sequence emitted by the semiconductor laser LD 104 at a time of recording includes a top heating pulse Htop followed by a plurality of heating pulses Hmp, and a plurality of cooling pulses Cmp occurring therebetween, respectively, as shown in FIG. 1B. At this time, it is supposed that the light-emission power Phtop of the top heating pulse Htop and the light-emission power Phmp of the following heating pulse Hmp are the same.

A constant current corresponding to a light-emission power Ph of the top heating pulse Htop and the following heating multi-pulses Hmp from the driving current source 106 in the LD driver part 102 is supplied to the semiconductor laser LD 104 in the optical head 103, a constant current corresponding to a light-emission power Pcmp (Pc) of the cooling multi-pulses Cmp is also supplied thereto, and also, a light-emission power Pe of an erase pulse E is supplied thereto.

Figure 3:
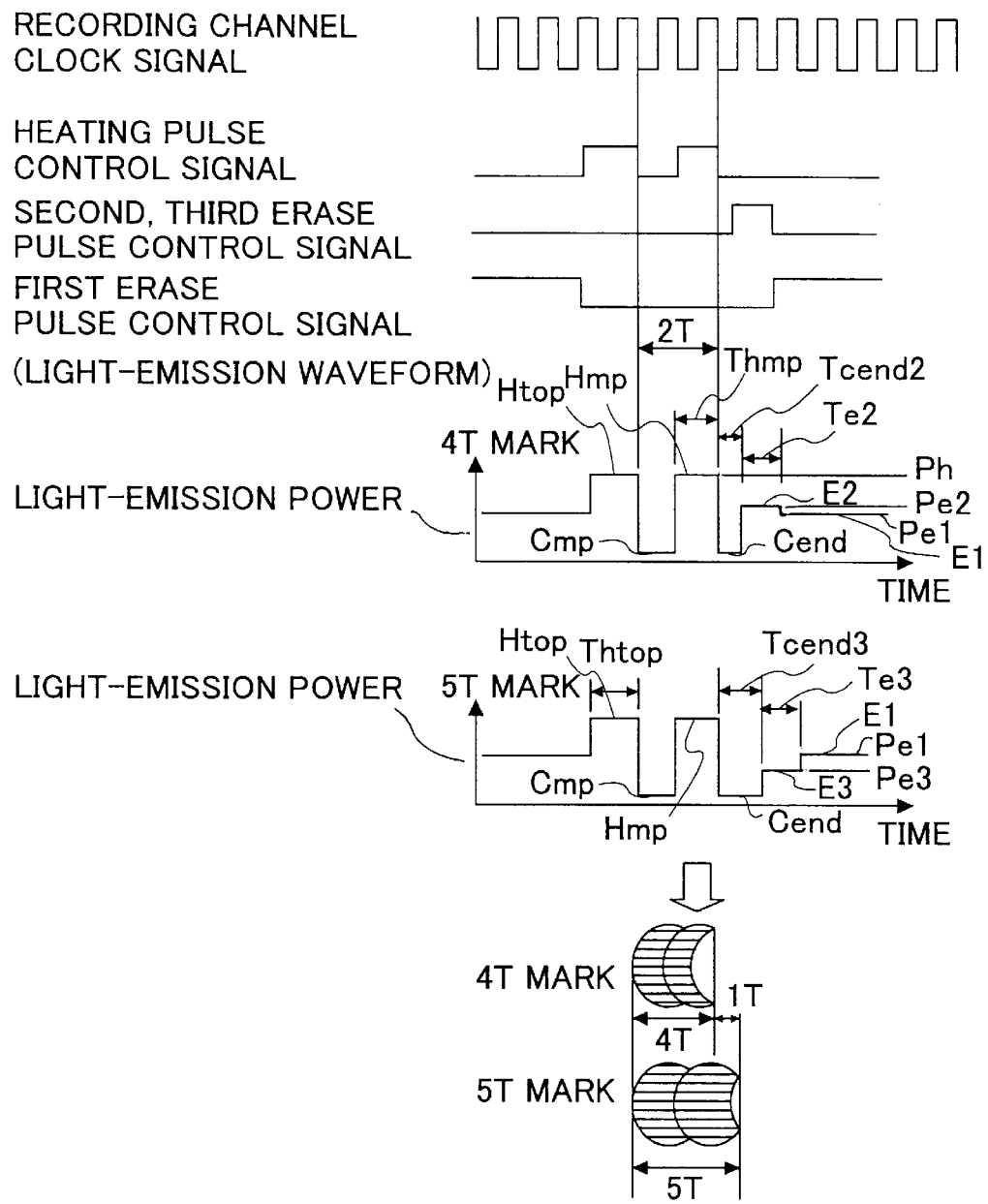
FIG. 3 illustrates the embodiment of the present invention applied for high-speed recording same as the embodiment illustrated in FIG. 1B.

Furthermore, according to a heating pulse control signal, a first erase pulse control signal for erase pulse E, and a control signal for erase pulse for recording mark from the recording pulse sequence control part 108, and based on EFM data, a switching device 107 of the LD driver part 102 controls turning on/off of the respective driving current sources (constant current sources). The corresponding drive current source is thus made to be turned on/turned off, light is made to emit with the light-emission waveform of multi-pulse sequence as shown in FIG. 3 by driving of the semiconductor laser LD 104.

Next, the light-emission waveform according to the fifth embodiment will now be described in detail. Even in case the recording channel clock frequency is high for the purpose of high-speed recording, an information recording scheme according to the fifth embodiment of the present invention enables precise recording on the phase-change optical disk 101 as a result of employing the recording waveform as shown in FIGS. 1B and 3.

The light of the multi-pulses emitted by the semiconductor laser LD 104 has a pulse width of approximately 1.0T on the top heating pulse Htop, and, has a pulse width of approximately 1.0T on the last cooling pulse Cend, when recording a mark of 3T (T is the period of the recording channel clock signal) which is the shortest mark length, as shown in FIG. 1B. Then, based on this waveform, in recording record marks of mark data length in odd number length, i.e., 5T, 7T, 9T, and 11T with respect to the period T of the recording channel clock signal, between the top heating pulse Htop and last cooling pulse Cend, a pair of a heating pulse Hmp having a pulse width of approximately 1.0T (Thmp) and a cooling pulse Cmp having a pulse width of approximately 1.0T (2T−Thmp) is inserted for increase of each two clock pulses 2T of the recording channel clock signal.

Similarly, in recording record marks of mark data length in even number length, i.e., 4T, 6T, 8T, 10T and 14T, between the top heating pulse Htop and last cooling pulse Cend, a pair of a heating pulse Hmp having a pulse width of approximately 1.0T (Thmp) and a cooling pulse Cmp having a pulse width of approximately 1.0T (2T−Thmp) is inserted for increase of each two clock pulses 2T of the recording channel clock signal.

That is, combinations of the record marks of 4T and 5T; 6T and 7T; 8T and 9T; 10T and 11T have the heating pulses and cooling pulses in the same numbers respectively on the basis of the mark length of 3T. Therefore, while the total length in the conventional record waveform as shown in FIG. 1A is n−0.5T and, thus, it is fixed, the total length of multi-pulse sequence does not become fixed according to the fifth embodiment of the present invention.

Moreover, each combination which has the above-mentioned heating pulses and cooling pulses of the same number is set up into a recording waveform under a rule which is different, as shown in FIG. 3. First, a pulse width of the last cooling pulse Cend of a short mark data length (even number, for example, 4T) is approximately 0.75, and, thus, is narrow, while, a pulse width of the last cooling pulse Cend of a long mark data length (odd number, for example, 5T) is approximately 1.25, and, thus, is wide.

Furthermore, an erase pulse E2 for record mark is added to a top part of erase pulse E1 (erase power of Pe1) just behind the last cooling pulse Cend the short mark data length with the pulse width Te2 of approximately 1.0T. On the other hand, an erase pulse E3 for record mark is added to a top part of erase pulse E1 (erase power of Pe1) also just behind the last cooling pulse Cend of the long mark data length with the pulse width Te3 of also approximately 1.0T. There, an erase power Pe2 is applied during the erase pulse E2, while an erase power pe3 is applied during the erase pulse E3, and the ratio of the above-mentioned erase power with respect to the heating power Ph is set such that:

$\epsilon 1 = Pe1/Ph$

Then, the absolute power is set such that satisfactory erase effect occurs, for example, Pe1=7.7 (mW)
Ph=14 (mW)
$\epsilon 1$=0.55

Further, setting is made such that:

$\epsilon 2 = \epsilon 1 + 0.1$ where $\epsilon 2$ denotes a ratio of an erase power Pe2 on the above-mentioned erase pulse E2 with respect to the heating power Ph. For example, Pe2=9.1 (mW)
Ph=14 (mW)
$\epsilon 2$=0.65

Similarly, setting is made such that:

$$\epsilon 3 = \epsilon 1 - 0.1$$

where $\epsilon 3$ denotes a ratio of an erase power Pe3 on the above-mentioned erase pulse E3 with respect to the heating power Ph. For example, Pe3=6.3 (mW)
Ph=14 (mW)
$\epsilon 3$=0.45

Thereby, as shown in FIG. 3, in each of combinations between mark data lengths having the same number of heating pulses and cooling pulses, for example, 4T mark and 5T mark, the short mark length is shorter than the long mark length by approximately 0.5T due to the difference in the pulse width on the last cooling pulse. Furthermore, as the above-mentioned ratio $\epsilon 2$ of the erase power Pe2 with respect to the heating power Ph is smaller than $\epsilon 3$ of the erase power Pe3 with respect to the heating power Ph by approximately 0.5, the tail edge of the record mark is erased more on the short mark length. Thereby, the record mark on the short mark length is further shorter than the record mark on the long mark length by 0.5T. Accordingly, the record mark on the short mark length is shorter than the record mark on the long mark length by total 1.0T, as shown in FIG. 3.

Therefore, by appropriately setting difference in the pulse width Tcend on the last cooling pulse Cend and difference between the ratios $\epsilon 2$ and $\epsilon 3$ on the erase power Pe2 and Pe3 on the erase pulses E2 and E3, respective marks on all the mark data length can be formed precisely by 1T step each.

Thus, for two mark data lengths for which the numbers of heating/cooling pulses are same therebetween, the erase pulse E2 on the short mark length has the power level Pe2 higher than the original first erase power Pe1, while the erase pulse E3 on the long mark length has the power level Pe3 lower than the original first erase power Pe1. Furthermore, the pulse width Tcend2 on the last cooling pulse for the short data length is made shorter than the pulse width Tcend3 on the last cooling pulse for the long data length. Thereby, the resulting record marks thereon have the difference in mark length by precisely 1T.

More specific setting range etc. will now be described on the fifth embodiment. Generally the erase power Pe used for the phase-change optical disk 101 of AgInSbTe family is on the order in a range between 0.4×Ph and 0.7×Ph. When the power is lower than this range, the erase power required for overwrite may not be obtained, but insufficient erase may arise, and thus, jitter of RF signal at a time of reproduction may get worse. When the power is higher than this range conversely, the permissible number of times of overwrite in terms of degradation of the recording film may be degraded then.

Therefore, it is difficult to create the difference 1T in the mark length only by the difference between the above-mentioned ratios $\epsilon 2$ and $\epsilon 3$, according to the permissible range of the erase power Pe2 and Pe3. Actually, it is possible to make setting such that the difference within a range approximately between 0.3T and 0.7T be created. Thus, it is preferable to make a setting such that, as shown in FIGS. 1B and 3, the difference on the order of approximately 0.5T is created. Accordingly, according to the property of the phase-change optical disk 101, setting according to the following requirements should be made:

$$\epsilon 1 + 0.05 < \epsilon 2 < \epsilon 1 + 0.20,$$

and, also, $$\epsilon 1 - 0.15 < \epsilon 3 < \epsilon 1 - 0.05$$

Thereby, it is possible to create a large difference (close to 1T) between two mark data lengths having the same number of heating/cooling pulses with appropriate erase power ratios. That is, according to the fifth embodiment, it is possible to create the difference in mark data length by approximately 0.5T only by means of difference in erase power by making setting such that:

$\epsilon 1$=0.55
$\epsilon 2$=0.65
$\epsilon 3$=0.45

The pulse width Tcend of the last cooling pulse used on the phase-change optical disk 101 of AgInSbTe family is on the order of a range between 0.5T and 1.5T. Sufficient cooling time may not be obtained, and also, edge cannot be clearly formed after the record mark, thus jitter on the R F signal at a time of reproduction may get worse, when a shorter pulse width than this range is applied. When a longer pulse width than the above-mentioned range is applied conversely, an attainable temperature on the recording may be degraded, sudden cooling requirement may no longer be acquired enough, and thus jitter on the RF signal at a time of reproduction may get worse too.

Therefore, it is difficult to create the difference 1T in the mark length only by the difference between the above-mentioned pulse widths Tcend2 and Tcend3, according to the permissible range on the pulse widths Tcend2 and Tcend3. Actually, it is possible to make setting such that the difference within a range approximately between 0.25T and 0.75T be created. Thus, it is preferable to make a setting such that, as shown in FIGS. 1B and 3, the difference on the order of approximately 0.5T is created. Accordingly, according to the property of the phase-change optical disk 101, setting according to the following requirements should be made:

Difference (Tcend3–Tcend2) should fall within a range between 0.25T and 0.75T

Thereby, it is possible to create a large difference (close to 1T) between two mark data lengths having the same number of heating/cooling pulses with appropriate erase power. That is, according to the fifth embodiment, it is possible to create the difference in mark data length by approximately 0.5T only by means of difference in pulse width of the last cooling pulse Cend by making setting such that:

Tcend2=0.75T
Tcend3=1.25T

Generally, phase-change media, such as in CD-RW and DVD-RW, are designed so that recording is made at a predetermined recording line speed according to a capability of an information recording/reproducing device applied. For example, as to CD-RW, the recording line speed falls in a range between 4.8 m/s (four-time speed) and 12 m/s (ten-time speed). As to DVD-RW, the recording line speed is in a range between 3.5 m/s (one-time speed) and 8.4 m/s (2.4-time speed). According to the fifth embodiment, the recording line speed is in a range between 16-time speed and 32-time speed on CD-RW, and in a range between four-time speed and eight-time speed on DVD-RW.

As shown in FIGS. 2A and 2B, rising-up time and decaying-down time of recording waveform depend on the response speed of the LD driver part 102. Thus, it is limited to the order of 2 nanoseconds, in general, according to the response speed of the semiconductor laser LD 104 actually used, the wiring length of a flexible board mounted, and so forth. When the recording channel clock frequency in high-speed recording exceeds 100 MHz, the pulse widths Th and Tcmp on heating pulse and cooling pulse become on the order of 5 nanoseconds, and, thereby, the portion on the rising-up/decaying-down increases, and, thereby, sufficient heating/cooling may not be performed.

Therefore, in applying the above-described scheme according to the fifth embodiment, high accuracy setting should be preferably made by appropriately controlling the erase power Pe2/Pe3 and pulse width Tcend2/Tcend3 on the last cooling pulse according to the performance inherent to the information recording device, such that the different in mark data length between two mark data lengths having the same numbers of heating/cooling pulses be properly created.

Such setting information may be determined previously on a particular recording medium, and then, may be embedded therein, which is then read out by an information recording/reproducing device before actual recording is made, and, thereby, the actual recording according to the correct setting information can be achieved.

According to the fifth embodiment, such setting information (on the above-mentioned ratios $\epsilon2$, $\epsilon3$ on the erase power and pulse widths Tcend2, Tcend3 on the last cooling pulse) is previously embedded into the optical disk 101, and is then detected by the following method:

A wobble signal acquired from a meandering form added to a guidance slot formed in a substrate surface of the phase-change optical disk 101 is separated from a push-pull signal for acquiring a tracking error signal. Then, information peculiar to the recording medium given by frequency modulation (in the case of CD-RW), or phase modulation (in the case of DVD-RW), is restored, and, thus, the relevant setting information is obtained.

In general, a groove slot for acquiring a tracking error signal (push-pull signal) is formed on a disk, such as CD or DVD, and, thereon, a wobble signal is embedded by bending the grove slot in a staggering manner. This signal is detected on each recording line speed, through a programmable BPF, and then, frequency demodulation/phase demodulation is performed thereon so that the coded information is obtained by the decoding processing. Thereby, from a non-recorded disk, such setting information peculiar to the disk can be obtained. This information may be embedded by a manner such that intermittent pits are formed into land parts, as known in the art (in case of DVD-RW).

Thus, by previously embedding such setting information (on the above-mentioned ratios $\epsilon2$, $\epsilon3$ on the erase power and pulse widths Tcend2, Tcend3 on the last cooling pulse) into a pre-format part as information peculiar to a relevant medium demodulated from the wobble signal, the information recording/reproducing device applied thus can obtain the ratios $\epsilon2$, $\epsilon3$ on the erase power of the optimal erase pulses and pulse widths Tcend2, Tcend3 on the last cooling pulses which can be obtained from the wobble signal, for record mark corresponding to each recording speed, from the relevant phase-change optical disk 101.

Instead of utilizing the setting information from the information recording medium (phase-change disk 101) itself, the following method may be applied: That is, IDs and setting information including the above-mentioned recording conditions peculiar to the media of subject phase-change optical disks are previously stored in a memory part (recording condition preservation part) in which firmware of the information recording/reproducing device itself is stored. Then, the relevant setting information is selected from that stored in the memory part according to a medium ID recognized from the relevant disk 101 loaded therein.

Thus, by utilizing the setting information on recording conditions optimized for the particular information recording/reproducing device without using the information embedded into the medium (phase-change optical disk 101), variation in diameter of laser spot by LD wavelength, NA and a light-emission waveform peculiar to the information recording/reproducing device can be compensated or coped with, and thus, it becomes possible to perform further highly precise recording.

Under the present circumstances, as the setting information is preferably stored updateable in the memory part (record condition preservation part), the ratios $\epsilon2$, $\epsilon3$ of erase power and pulse widths Tcend2, Tcend3 of the last cooling pulses may thus be updated any time if necessary, and, thus, the latest conditions of the device can be reflected by the setting information. In particular, in case the information recording/reproducing device is made to be built in an information processing device, the latest setting information may be updated by downloading it through the Internet.

Figure 4:
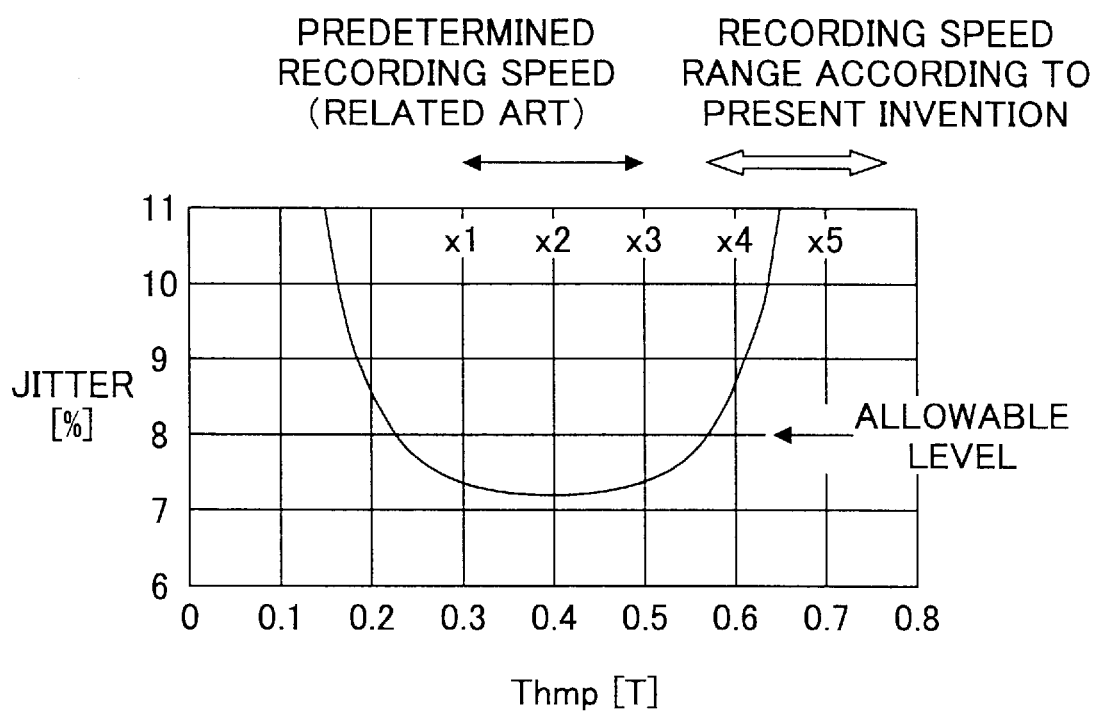
FIG. 4 illustrates relationship between heating pulse width and jitter.

A sixth embodiment of the present invention will now be described. Generally, an optimum recording waveform corresponding to a particular recording speed on the phase-change optical disk 101, such as a CD-RW or a DVD-RW is fixed. For example, on a DVD-RW designed to be suitable to a range between one-time speed (3.5 m/s) and 2.6-time speed (8.5 m/s), as shown in FIG. 4, setting is made such that the pulse width Thmp of successive heating pulses following the top heating pulse of multi-pulse sequence may vary within a range between 0.3T and 0.55T. On the thus-designed phase-change disk 101, in case of a recording speed beyond the predetermined range, the pulse width Thmp of the heating pulse Hmp exceeds 0.55T, and, thereby, sufficient cooling speed cannot be secured, and, thus, jitter at a time of reproducing may become degraded.

Therefore, according to the sixth embodiment, on a recording speed within the predetermined range, the multi-pulse sequence of heating pulses and cooling pulses having the same period as the recording channel clock period T is generated as in the related art as shown in FIG. 1A. On the other hand, on a recording speed beyond the predetermined range, such as three-time speed, or four-time speed, i.e., high-speed recording, recording is performed applying the configuration of multi-pulse sequence as described in the fifth embodiment as shown in FIG. 1B. That is, the pulse width of each recording pulse (heating/cooling pulse) is widened, increase in the number of the heating pulses and cooling pulses in multi-pulse sequence in response to increase in the mark data length is performed in a different manner, and, also, as described above, the ratios $\epsilon2$, $\epsilon3$ on the erase pulses and pulse widths Tcend2, Tcend3 on the last cooling pulses are newly set. Thereby, even when the recording speed exceeds the range specified for the relevant phase-change optical disk, recording which can result in sufficient reproduction characteristics having low jitter can be performed.

Figure 13:
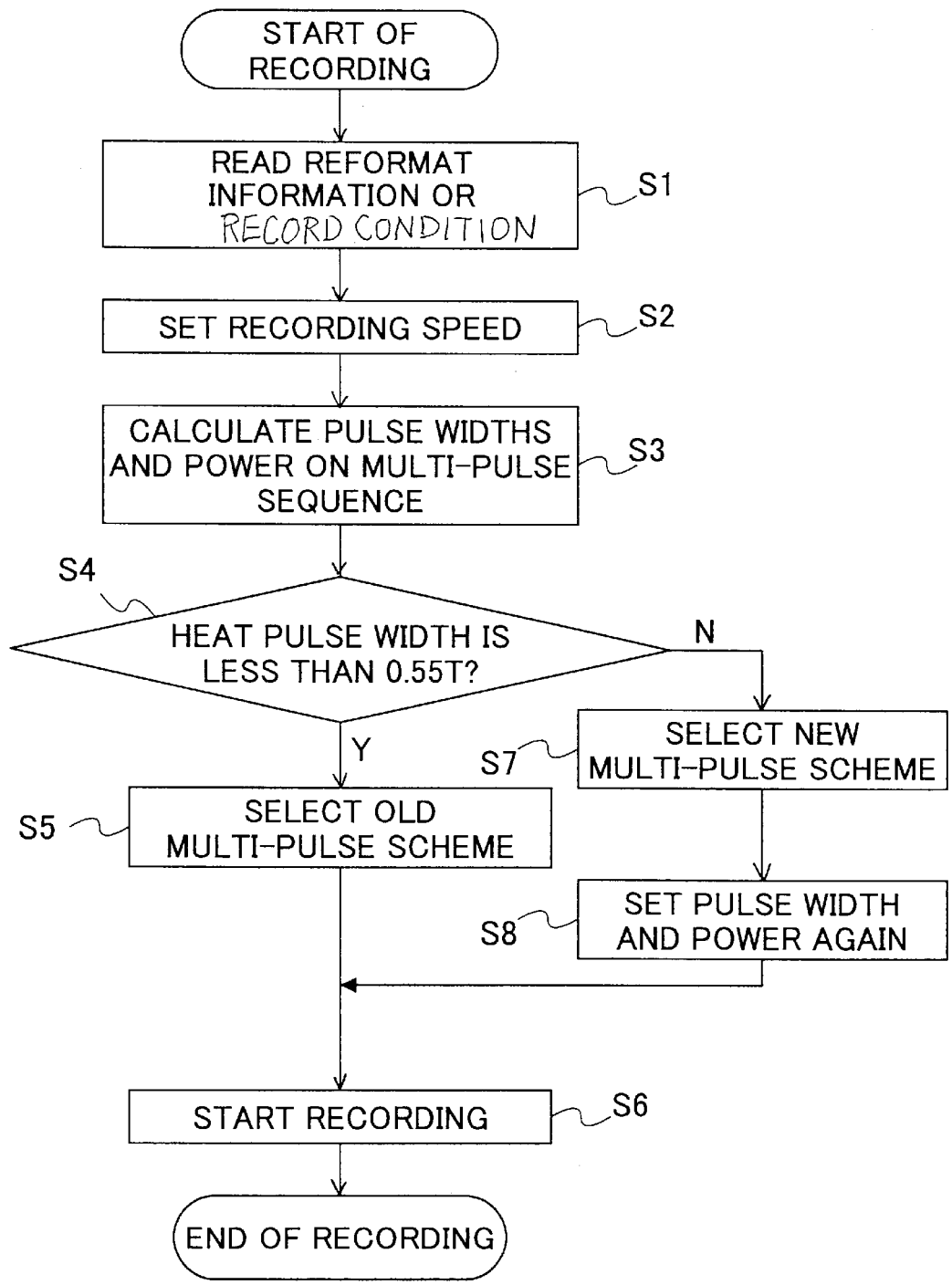
FIG. 13 shows a flow chart illustrating processing control in the embodiment of the present invention illustrated with reference to FIGS. 1B and 3.

FIG. 13 shows a flow chart illustrating an example of general processing control of recording operation including such switching operation according to the sixth embodiment of the present invention. After reading the setting information on the record conditions of the pre-format information embedded on the phase-change optical disk 101, or that previously stored in the record condition preservation part of the information recording/reproducing device applied after loading the target phase-change optical disk 101 therein (in a step S1), based on the setting information corresponding to the recording speed, each pulse width, each power, etc. of multi-pulse sequence of light-emission waveform, are calculated (in a step S3) in response to a setup of the recording speed made by a user (in a step S2).

According to the thus-obtained calculation results, it is determined whether or not the thus-obtained pulse width Thmp is smaller than 0.55T (in a step S4). In case it is smaller than 0.55T (Yes in the step S4), since it is recording operation in the recording speed range for the conventional recording, the conventional multi-pulse sequence (as sown in FIG. 1A) is chosen (in a step S5), and recording operation is performed accordingly (in a step S6).

When the pulse width Thmp is not smaller than 0.55T (No in the step S4), since it is thus high-speed recording operation exceeding the recording speed for which the conventional scheme may not match, multi-pulse sequence according to the above-described fifth embodiment (as shown in FIG. 1B) is chosen (in a step S7). Then, respective pulse widths Thtop, Thmp, Tcend2, Tcend3, Te3, respective power Ph, Pc, Pe2, Pe3 are newly set (in a step S8), recording operation is performed (in the step S6).

As the above-mentioned phase-change disk 101, any phase-change disk such as a CD-RW, a DVD-RW, or the like which is designed for a predetermined recording speed range may be applied.

FIG. 14 shows the information recording device embodying the scheme according to the above-mentioned sixth embodiment of the present invention.

The rotation control mechanism 109 includes the spindle motor 105 which carries out rotation driving of the phase-change optical disk 101. The optical head 3 is provided with the semiconductor laser 104, object lens, and so forth, carries out condensing and applying the laser light onto the phase-change optical disk 101, and is movable (seek operation) along disk radius direction. An actuator control mechanism 110 is connected to an object lens and an outputting system of the optical head 3. A wobble detection part 12 includes the programmable BPF 111 and is connected to the above-mentioned actuator control mechanism 110. An address demodulation circuit 113 which demodulates addresses from the detected wobble signal is provided in the wobble detection part 112. With this address demodulation circuit 113, a recording clock generation part 115 including a PLL synthesizer circuit 114 is connected. A driving controller 116 is connected to the PLL synthesizer circuit 114.

The rotation control mechanism 109, actuator control mechanism 110, wobble detection part 112, and address demodulation circuit 113 are also connected to the driving controller 116 connected to the system controller 117.

Moreover, an EFM encoder 118, a mark length counter 119, and a pulse number control part 120 are connected to the system controller 117. To the EFM encoder 118, a mark length counter 119, and a pulse number control part 120, a recording pulse sequence control part 108 are connected. This recording pulse sequence control part 108 includes a heating pulse generation part (recording pulse generation part) 121 which generates the heating pulse control signal including top heating part and following heating/cooling parts; a first erase pulse generation part 22 which generates a first erase pulse control signal, a second and third erase pulse generation part (erase pulse generation part) 23 which generates second and third erase pulse control signals, an edge selector 24, and a pulse edge generation part 25.

In the output side of this recording pulse sequence control part 108, the LD driver part 102 is connected which controls switching of the respective, driving current sources 106 on the heating power Ph, cooling power Pc, first erase power Pe1, second erase power Pe2 and third erase power Pe3, so as to drive the semiconductor laser LD 104 in the optical head 103 with the relevant power.

In such a configuration, in order to perform recording onto the phase-change optical disk 101, address demodulation is performed from the wobble signal, obtained through separation detection with the programmable BPF 111 from the push pull signal acquired from the optical head 3, after controlling the rotation speed of the spindle motor 105 by the rotation control mechanism 109 into the recording line speed corresponding to the target recording speed. Also, the PLL synthesizer circuit 114 generates the recording channel clock signal.

Next, in order to generate the recording pulse sequences by the semiconductor laser LD 104, the recording channel clock signal and EFM data which is record information are input into the recording pulse sequence control part 108, and the heating pulse control signal containing the top heating pulse and the heating multi-pulses following thereto are generated by the heating pulse generation part 121 in the record pulse sequence control part 108. Further, the first erase pulse generation part 122 generates the erase pulse control signal which is the erase portion. Then, through the switching of the driving current source 106 set as providing the respective one of the above-mentioned Ph, Pe (Pe1) and Pc in the LD driver part 102, the LD light-emission waveform of recording pulse sequence can be obtained.

In this information recording device shown in FIG. 14, a multi-stage pulse edge generation part 125 is provided with the heating pulse generation part 121, which has the resolution of 1/20 the recording channel clock period. Thereby, by using edge pulses selected by the system controller 117 after being input into the selector (multiplexer) 124, the top heating pulse control signal and heating multi-pulse control signal are generated. A multi-stage delay circuit of the pulse edge generation part 125 may be formed of gate delay devices, ring oscillator and a PLL circuit having high resolution. Thus, the multi-pulse sequence synchronized with the recording channel clock signal is created by the thus-generated heating pulses, and, the pulse width of cooling pulses are also simultaneously determined by duty with respect to the heating multi-pulse width.

Similarly, the edge pulses generated in a multi-stage delay circuit of a last cooling pulse generation part provided individually or the cooling pulse generation part in the heating pulse generation part 121, are input into the edge selector 124, and thus the rear edge of the last cooling pulse is defined by the edge pulse chosen by the system controller 117.

Also in the erase pulse generation parts 122, 123, through selection of second front and rear edge pulses generated by another multi-stage delay circuit so as to determine the predetermined pulse width Te2, the second or third erase pulse is generated immediately after the last cooling pulse.

The whole recording multi-pulse sequence is thus created as a pulse group.

The mark length counter 119 for carrying out calculation of the mark length of the EFM signal acquired from the EFM encoder 118 is provided, and thereby, whenever the mark count value increases by 2T, one pair of heating/cooling pulses are generated through the pulse number control part 120 in the recording pulse sequence control part 108. This operation becomes possible by selecting the rear edge for the top heating pulse by the edge selector 124, then, selecting the front edge of the following one of multi-pulses by the edge pulse generated by the following recording channel clock period, and, then, the rear edge of the one of multi-pulses is defined by the edge pulse generated by the subsequent channel clock period.

As a configuration of an alternative multi-pulse generation part, a recording divided clock signal is generated through two-time dividing of the recording channel clock signal, and, therefrom, edge pulses are generated by using a multi-stage delay circuit. Then, selection is made therefrom, and, thus, necessary front and rear edges are defined. Thereby, a pair of heating/cooling pulses are generated for every 2T increase in the recording channel clock signal. In this configuration, the substantial frequency of multi-pulse generation part is set one half, and thus, further higher-speed recording operation can be attained.

According to the related art, a recording device for a phase-change optical disk 1 like a CD-RW or a DVD-RW has a recording pulse sequence control part which additionally generates a pair of heating/cooling pulses for every increase of 1T of mark data length for a predetermined recording speed range. Then, setting is made on the top heating pulse width Thtop, heating multi-pulse width Thmp which follow thereto, the pulse width Tcend on the last cooling pulse, and each light-emission power as being the optimum values according to the recording selected from the predetermined record speed range.

In contrast thereto, according to the present invention in the sixth embodiment, in addition to the above-described configuration according to the related art, switching of the recording pulse sequence control part 108 is made so as to cause it to instead, additionally generates a pair of heating/ cooling pulses for every 2T increase of the mark data length, when the specified recording speed exceeds the predetermined recording speed range. Thereby, it is possible to establish the information recording device having performance on a wider range of recording speed. For example, on a DVD-RW medium corresponding to the recording speed in a range between 1 and 3 times, high-speed recording such as in a range between 4 and 10 times can also be made. Moreover, it is also possible to realize further improved recording by tuning the DVD-RW medium to be suited to the recording scheme according to the sixth embodiment of the present invention.

Moreover, common information recording/reproducing device uses the semiconductor laser LD 104 as a light source, and as mentioned above, it is a limit that the rising-up/decaying-down time in light-emission waveform can be shortened up to approximately 2 nanoseconds in a cost-saving driving circuit. Especially for a phase-change medium of AgInSbTe used as a recording material therein, it is necessary to also secure approximately about more than 2 nanoseconds as an establishment time of each light-emission power considering sufficient heating time and cooling time. Therefore, around 100 MHz is a limit of the recording channel clock frequency, and, thus, approximately four-time speed (26.16 MHz×4) in DVD-RW is the limit in the related art. However, according to the sixth embodiment of the present invention, a substantial frequency of light-emission waveform can be reduced one half, and the information recording/reproducing device in each of this embodiment can perform high-speed recording up to 4-time speed or more about 8-time speed with a cost-saving configuration for DVD-RW, without increasing operation speed of the LD driver part 102 as light source driving part.

In addition, the setting values on the top heating pulse width, pulse width of the last cooling pulse and so forth shown above are merely typical value, and, actually, should be optimized according to recording material, medium phase configuration, etc. Moreover, since the total length of record waveform and thus-formed mark length may differ according to difference in recording modulation scheme, diameter of optical spot of laser light, and recording density, the correspondence between the resulting mark length and applied recording waveform may be altered appropriately, for a particular case.

Moreover, although the present embodiment is that applying an EFM family recording modulation scheme, another modulation scheme such as 1-7 modulation or the like may be used instead there.

Figure 15:
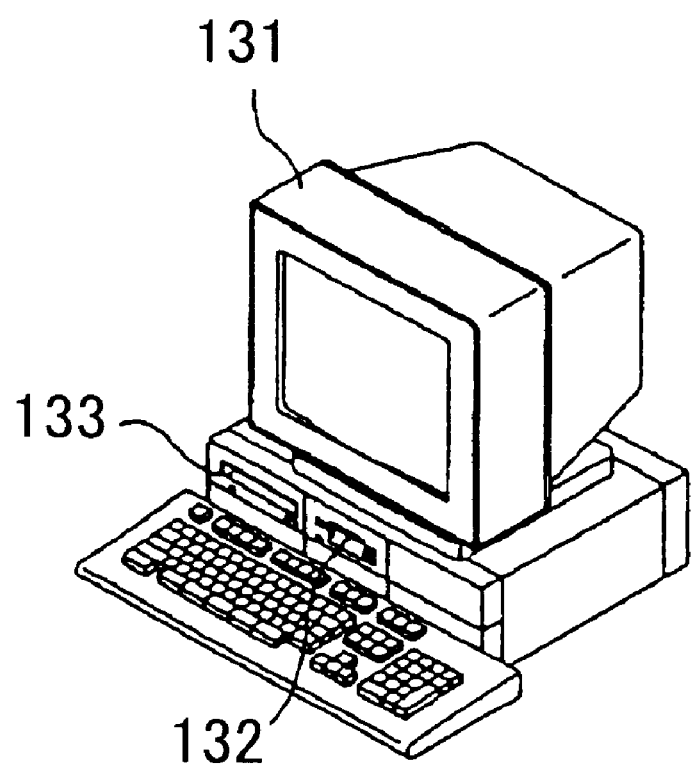
FIG. 15 illustrates a personal computer in which the information recording device shown in FIG. 14 may be applied.

FIG. 15 shows an example where the information recording/reproducing device having the configuration shown in FIG. 14 is applied in a personal computer 131 as an information processing device. In this example, other than a 3.5-inch floppy disk drive 132, the information recording device 133 such as that shown in FIG. 14 is built in the personal computer 131 as a DVD-RW drive.

According to the personal computer 131 having the configuration shown in FIG. 15, as the above-described information recording device 133 is included therein, it is possible to secure a sufficient heating time and cooling time by a pulse control scheme of a simple configuration, and, also, predetermined mark lengths can be created without increasing operation speed of the light source driving unit. Accordingly, it is possible to achieve high-speed recording of recording speed higher than the conventional phase-change optical disk recording speed range, and, thereby, a very useful peripheral information storage device can be provided thereby.

Figure 19:
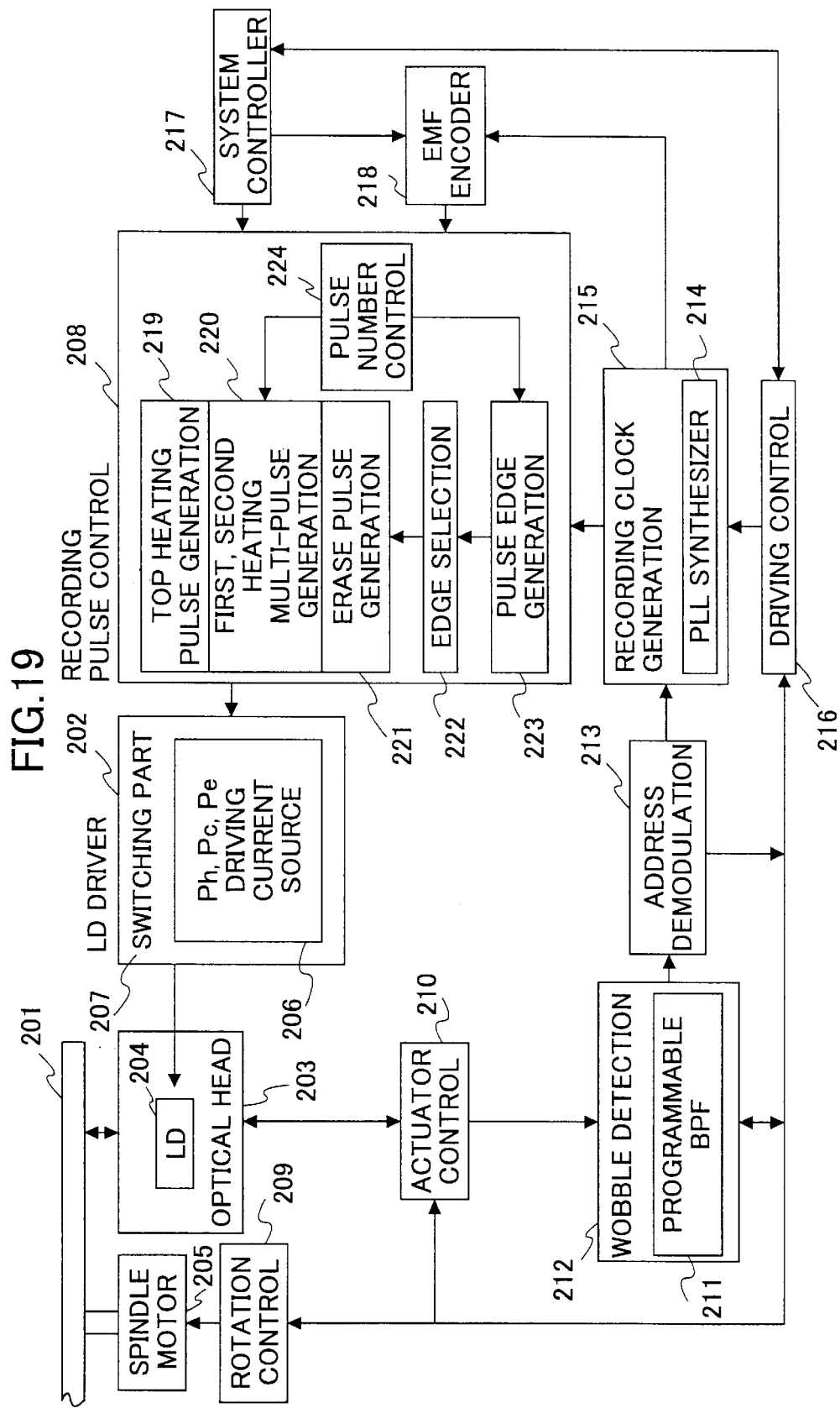
FIG. 19 shows a block diagram of an information recording device in the embodiment of the present invention also illustrated with reference to FIGS. 5B and 16.

A seventh embodiment of the present invention will now be described. FIG. 19 shows an example of a configuration of an information recording/reproducing device according to the seventh embodiment of the present invention. Similarly to the above-described fifth embodiment, this device records (overwrites) code data of CD-ROM format on a phase-change optical disk 201 which is an information recording medium, and performs mark edge (PWM) recording using EFM or EFM plus code (generally called EFM family code).

This information recording/reproducing device generates a pulse control signal based on a recording channel clock signal and EFM data at a time of recording. A semiconductor laser drive circuit (LD driver part) 202 drives a semiconductor laser (LD) 204 of an optical head 203 with a driving current according to the pulse control signal, and thus, causes the light source to emit a light-emission waveform of multi-pulse sequence, as shown in FIG. 5B. Information is thus recorded onto the phase-change optical disk 201 driven and rotted by a spindle motor 205, while light of the light-emission waveform of the multi-pulse sequence from the semiconductor laser LD 104 is applied to the phase-change recording layer of the phase-change optical disk 201 through an optical system (not shown) in the optical head 203, and thus, record marks are formed onto the phase-change optical disk 201.

At a time of reproduction, this information recording/ reproducing device drives the semiconductor laser LD 204 by the LD driver part 202, which is thus made to emit light at reproduction power (read power), the light of the reproduction power from the semiconductor laser LD4 is applied through the optical system onto the phase-change optical disk 201 in the optical head 203. Thus, a reproduction signal is obtained through reception of reflected light by a photoelectric device (not shown) through the optical system, and through photoelectric conversion.

The light of the light-emission waveform of the multi-pulse sequence emitted by the semiconductor laser LD 204 at a time of recording includes a top heating pulse Htop followed by a plurality of heating pulses Hmp, and a plurality of cooling pulses Cmp occurring therebetween, respectively, as shown in FIG. 5B. At this time, it is supposed that the light-emission power Phtop of the top heating pulse Htop and the light-emission power Phmp of the following heating pulses Hmp are the same.

A constant current corresponding to a light-emission power Ph of the top heating pulse Htop and the following heating multi-pulses Hmp from a driving current source 206 in the LD driver part 202 is supplied to the semiconductor laser LD 204 in the optical head 203, a constant current corresponding to a light-emission power Pcmp (Pc) of the cooling multi-pulses Cmp is also supplied thereto, and also, a light-emission power Pe of an erase pulse E is supplied thereto.

Figure 16:
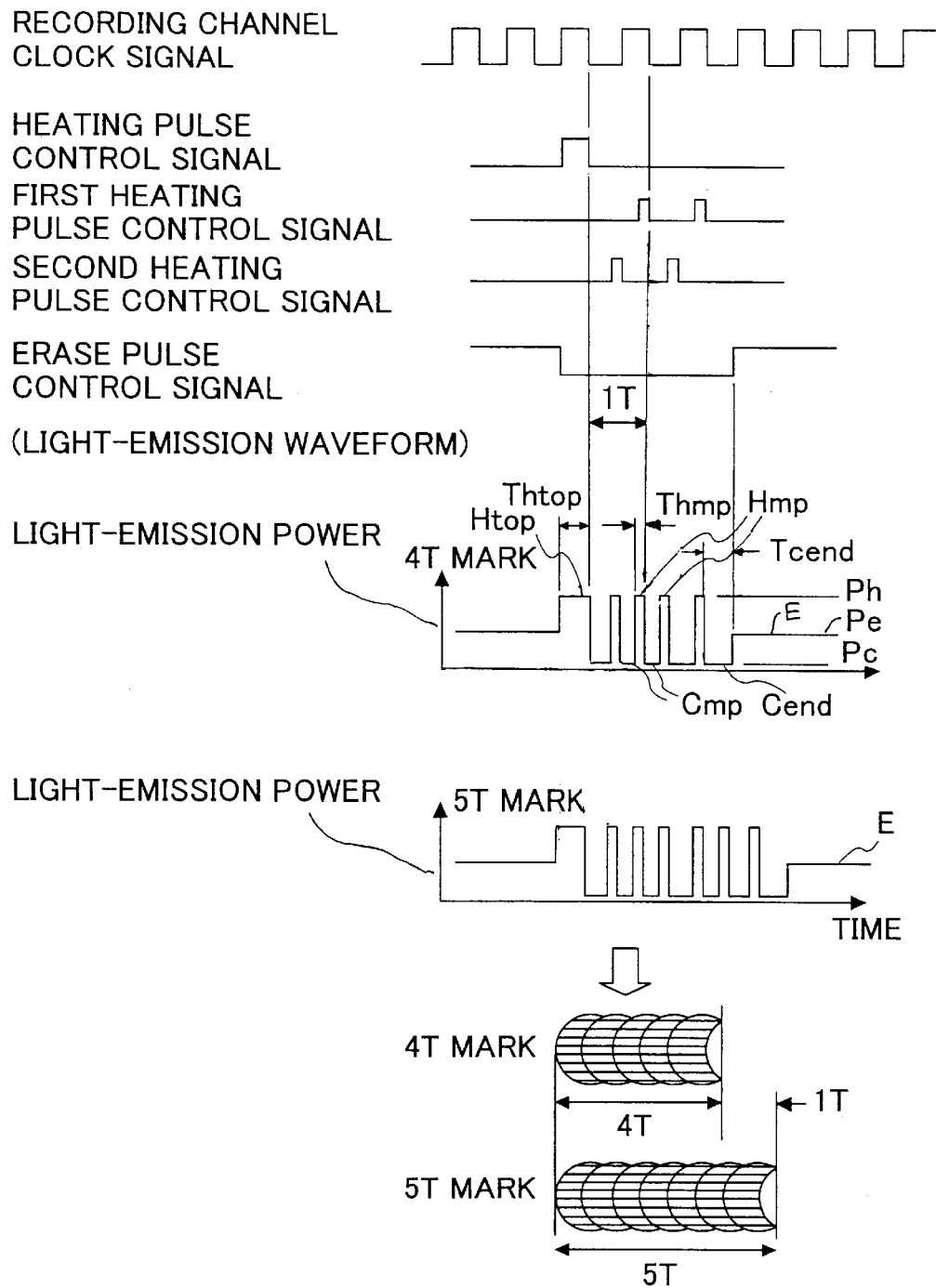
FIG. 16 illustrates the embodiment of the present invention also illustrated with reference to FIG. 5B applied in a case of low-speed recording.

Furthermore, a heating pulse control signal, a first erase pulse control signal for an erase pulse E, and a control signal for an erase pulse for recording mark, and based, on EFM data, a switching device 207 of the LD driver part 202 controls turning on/off of the respective driving current sources (constant current sources) according to the pulse control signal from the recording pulse sequence control part 208. The corresponding drive current source is made to be turned on/turned off, light is made to emit with the light-emission waveform of a multi-pulse sequence as shown in FIG. 16 by driving of the semiconductor laser LD 204.

The light of the multi-pulses emitted by the semiconductor laser LD 204 has a pulse width of approximately 0.5T on the top heating pulse Htop, and, has a pulse width of approximately 0.5T on the last cooling pulse Cend, when recording a mark of 3T (T is the period of the recording channel clock signal) which is the shortest mark length, as shown in FIG. 5B. Then, based on this waveform, in recording record marks at a recording speed lower than a predetermined recording speed for the phase-change disk 201, i.e., the recording channel clock frequency applied is lower than the predetermined one, two pairs, each including a heating pulse Hmp having a pulse width of approximately 0.2T (Thmp) and a cooling pulse Cmp having a pulse width of approximately 0.3T (0.5T−Thmp), are added for every increase in mark data length by one clock period 1T of the recording channel clock signal. That is, two pulses are increased for every one clock pulse, as shown in FIGS. 5B and 16.

Figure 5A:
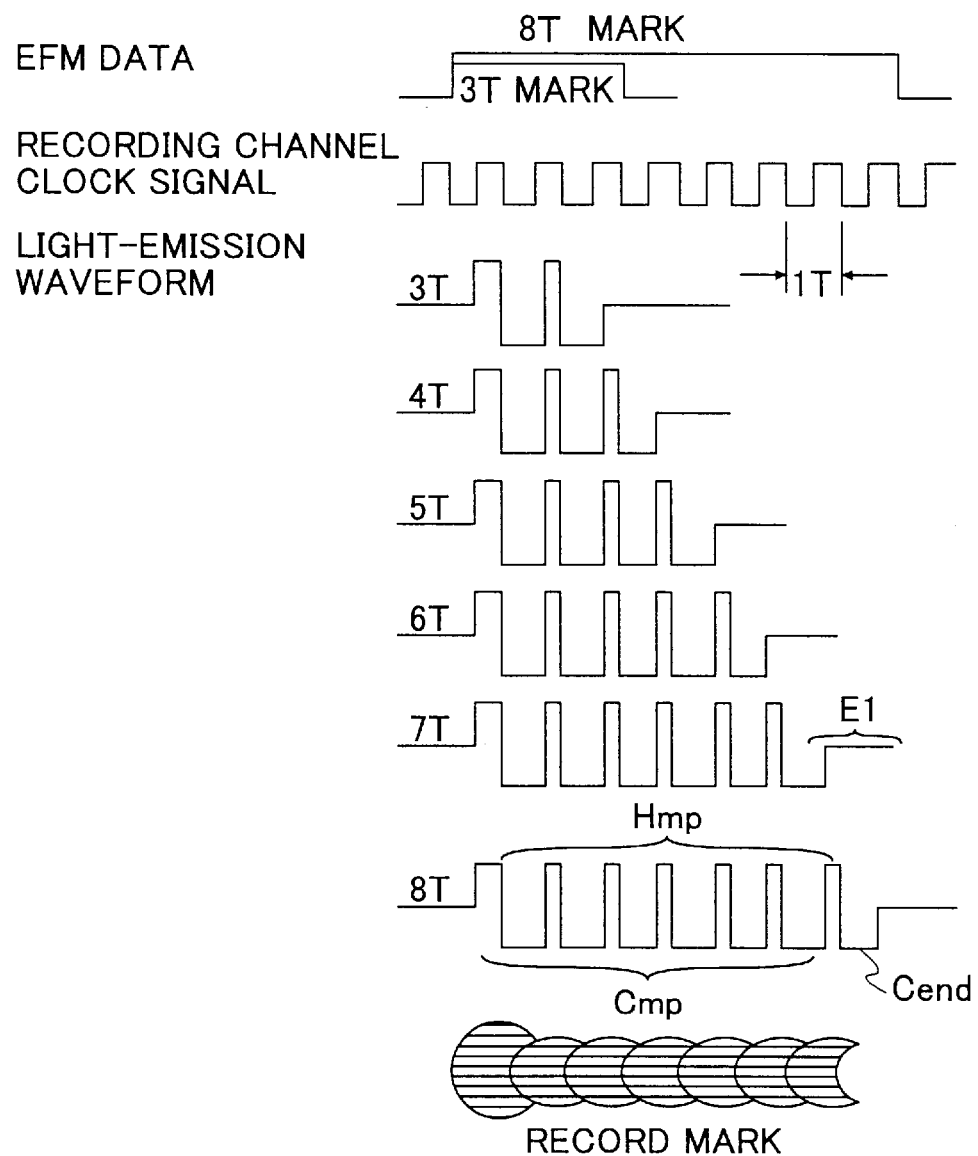
FIG. 5A illustrates light-emission waveforms in the related art in case of low-speed recording.
Figure 5B:
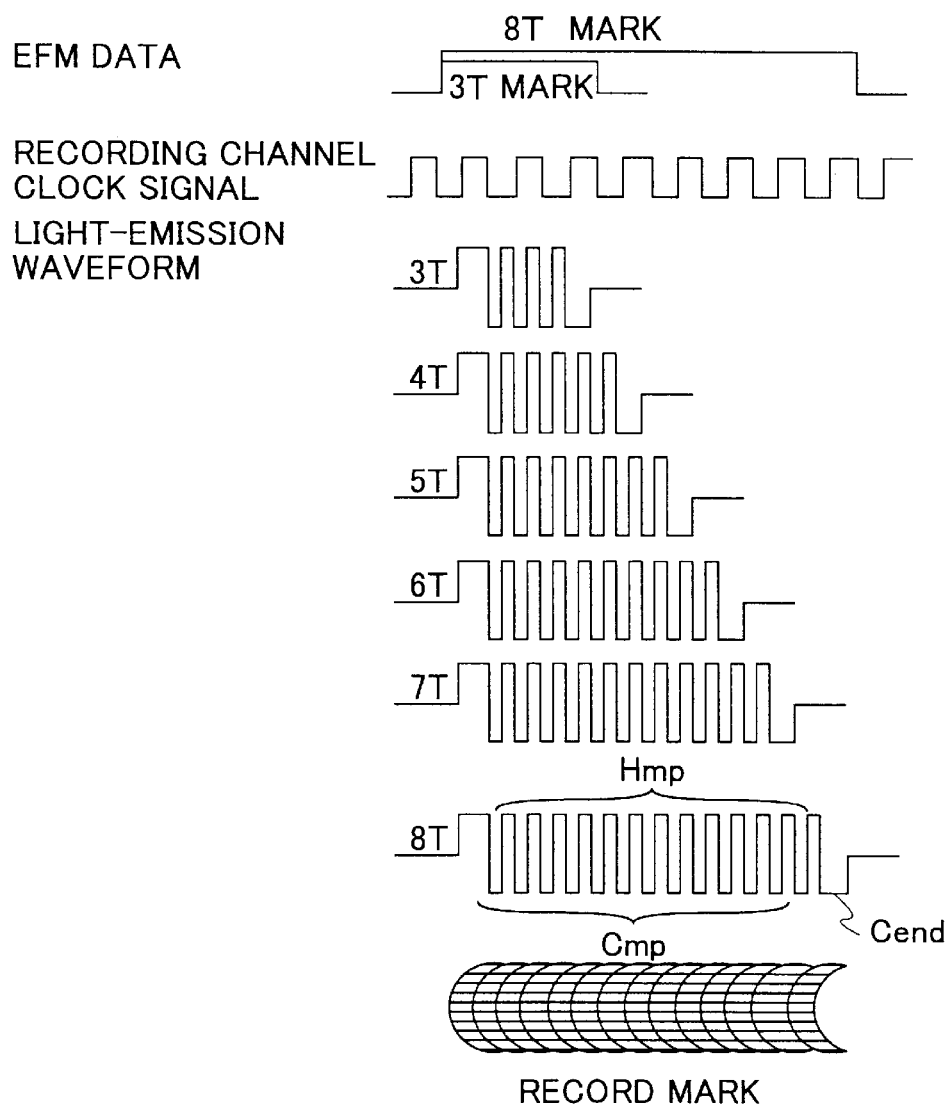
FIG. 5B illustrates light-emission waveforms in according to another embodiment of the present invention in case of low-speed recording requirement same as that shown in FIG. 5A.

Thus, according to the seventh embodiment of the present invention, a problem which may occur according to the conventional scheme shown in FIG. 5A where the heating pulse width is 0.2T while cooling pulse width is 0.8T, i.e., four times the heating pulse width, thereby, a sufficient sudden cooling requirement cannot be satisfied can be avoided. In fact, in the phase-change disk 201 having the recording material of AgInSbTe or so, a design has been made in general such that satisfactory recording can be achieved with the predetermined recording speed (with the predetermined recording channel clock frequency) with a ratio between heating pulse width and cooling pulse width only in a range between around 1:1 and 1:3. Then, according to the seventh embodiment, as mentioned above and shown in FIGS. 5B and 16, the above-mentioned ratio is approximately 1:2. The above-mentioned example of requirements in the ratio between heating pulse width and cooling pulse width only in a range between around 1:1 and 1:3 is that in case of a phase-change medium applied as a CD-RW or a DVD-RW actually used.

Furthermore, a setting is made according to the seventh embodiment, for example, such that:

$\epsilon 11 = Pe/Ph$

Pe=7 (mW)

Ph=14 (mW)

$\epsilon 11 = 0.5$ where $\epsilon 11$ denotes a ratio of an erase power Pe of an erase pulse E with respect to the heating power Ph of the heating pulses Htop and Hmp, shown in FIG. 16. These power values are set such that the attainable temperatures on the recording layer of the phase-change medium 201 be an optimum one in each of both the recording condition and erasing condition.

In general, a groove slot for acquiring a tracking error signal (push-pull signal) is formed on a disk, such as CD or DVD, and, thereon, a wobble signal is embedded by bending the grove slot in a staggering manner. This signal is detected on each recording line speed, through a programmable BPF, and then, frequency demodulation/phase demodulation is performed thereon so that the coded information is obtained by the decoding processing. Thereby, from a non-recorded disk, such setting information peculiar to the disk can be obtained. This information may be embedded by a manner such that intermittent pits are formed into land parts, as known in the art (in case of DVD-RW).

Thus, by previously embedding such setting information (on the above-mentioned ratio $\epsilon 11$ on the erase power and heating/cooling pulse widths, and whether one or two pairs of heating/cooling pulses be increase for increase in mark data length by every one clock pulse 1T of recording channel clock signal) into a pre-format part as information peculiar to a relevant medium demodulated from the wobble signal, the information recording/reproducing device applied can obtain the setting information which can be obtained from the wobble signal, for record mark corresponding to each recording speed from the relevant phase-change optical disk 201.

Instead of utilizing the setting information from the medium (phase-change disk 201) itself, the following method may be applied: That is, IDs and setting information including the above-mentioned recording conditions peculiar to the media of subject phase-change optical disks are previously stored in a memory part (recording condition preservation part) in which firmware of the information recording/reproducing device itself is stored. Then, the relevant setting information is selected from that stored in the memory part according to a medium ID recognized from the relevant disk 201 loaded therein.

Thus, by utilizing the setting information on recording conditions optimized for the particular information recording/reproducing device without using the information embedded into the medium (phase-change optical disk 201), variation in diameter of laser spot by LD wavelength, NA and a light-emission waveform peculiar to the information recording/reproducing device can be well compensated, and it becomes possible to perform further highly precise recording.

Under the present circumstances, as the setting information is stored preferably updateable in the memory part (recording condition preservation part), the ratio ell of erase power and heating/cooling pulse widths, and whether one or two pairs of heating/cooling pulses be increase for increase in mark data length by every one clock pulse 1T of recording channel clock signal may be updated any time if necessary, and, thus, the latest conditions of the device can be reflected by the setting information. In particular, in case the information recording/reproducing device is made to be built in an information processing device, the latest setting information may be updated by downloading it through the Internet.

Figure 17:
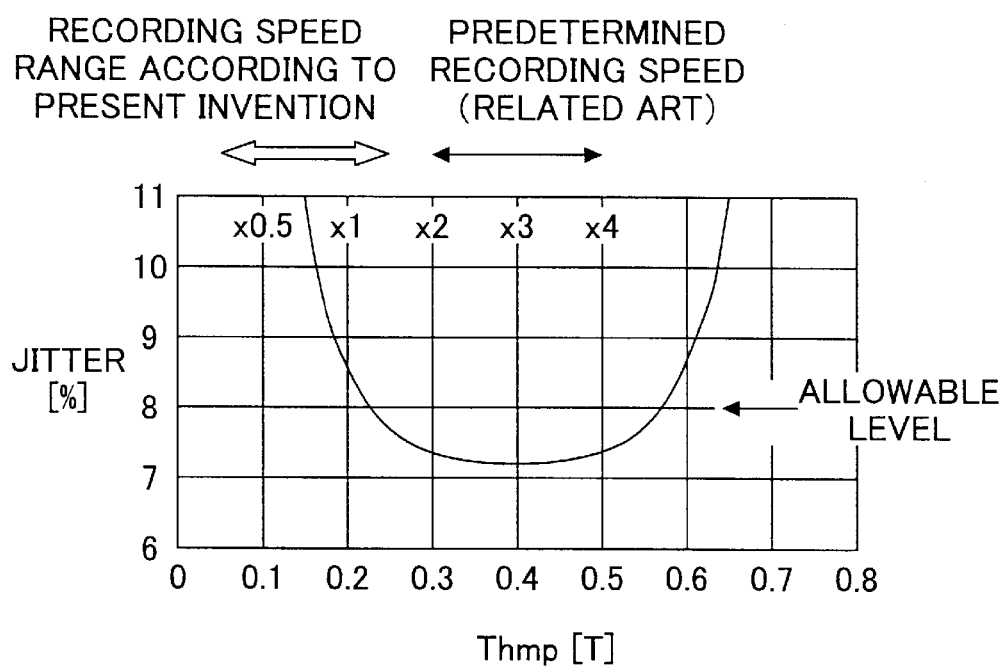
FIG. 17 illustrates relationship between heating pulse width and jitter for illustrating the embodiment of the present invention illustrated with reference to FIG. 16.

Generally, an optimum recording waveform corresponding to a particular recording speed on the phase-change optical disk 201, such as a CD-RW or a DVD-RW is fixed. For example, on a CD-RW designed to be suitable to a range between four-time speed (4.8 m/s) and ten-time speed (12 m/s), or on a DVD-RW designed to be suitable to a range between two-time speed (7 m/s) and five-time speed (16 m/s), as shown in FIG. 17, setting is made such that the pulse width Thmp of successive heating pulses Hmp following the top heating pulse of multi-pulse sequence may vary within a range between 0.25T and 0.55T. On the thus-designed phase-change disk 201, in case of a recording speed less than the predetermined range, the pulse width Thmp of the heating pulse Hmp becomes less than 0.25T, and, thereby, the ratio of the heating pulse width with respect to the cooling pulse width becomes too small, and, thus, a sufficient cooling requirement cannot be secured, and, thus, jitter at a time of reproducing becomes-degraded.

Therefore, according to an eighth embodiment, on a recording speed within the predetermined range, the multi-pulse sequence of heating pulses and cooling pulses having the same period as the recording channel clock period is generated as in the related art as shown in FIG. 5A. On the other hand, on a recording speed less than the predetermined range, such as one time speed through three-time speed (CD-RW), or one-time speed (DVD-RW), i.e., low-speed recording, recording is performed applying the configuration of multi-pulse sequence as described in the seventh embodiment as shown in FIG. 5B. Thereby, even when the recording speed becomes less than the range specified for the relevant phase-change optical disk, recording which can result in sufficient reproduction characteristics thus having low jitter can be performed.

Figure 18:
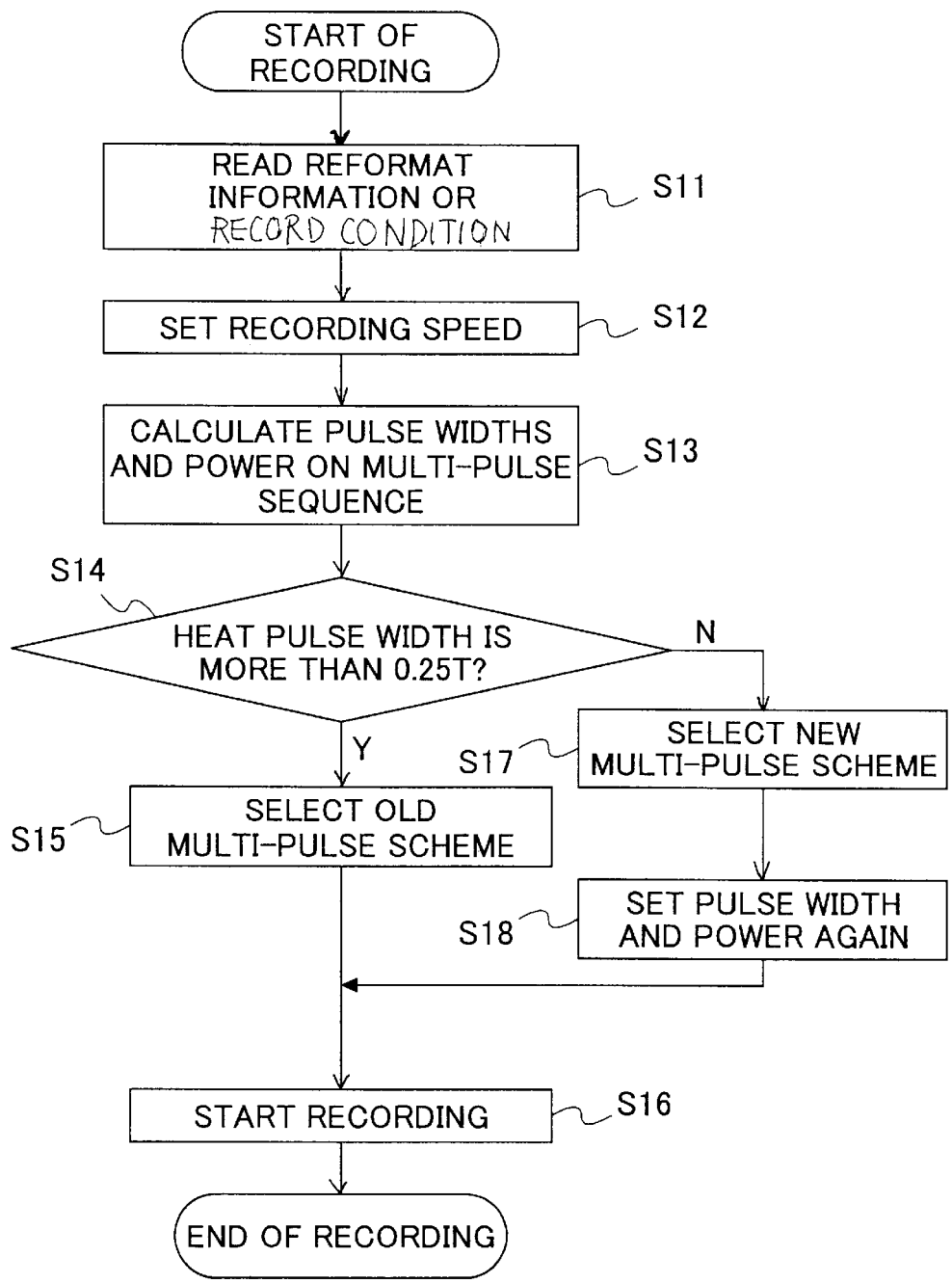
FIG. 18 shows a flow chart illustrating processing control in the embodiment of the present invention also illustrated with reference to FIGS. 5B and 16.

FIG. 18 shows a flow chart illustrating an example of general processing control of recording operation including such switching operation according to the eighth embodiment of the present invention. After reading the setting information on the recording conditions previously stored in the record condition preservation part of the pre-format information embedded on the phase-change optical disk 201, or stored in the information recording/reproducing device applied after loading the target phase-change optical disk 201 therein (in a step S11), based on the setting information corresponding to the recording speed applied, each pulse width, each power, etc. of multi-pulse sequence, are calculated (in a step S13) in response to a setup of the recording speed specified by a user (in a step S12).

According to the thus-obtained calculation results, it is determined whether or not the pulse width Thmp is longer than 0.25T (in a step S14). In case it is longer than 0.25T (Yes in the step S14), since it is recording operation in the recording speed range for the conventional recording, the conventional multi-pulse sequence (as sown in FIG. 5A) is chosen (in a step S15), and recording operation is performed accordingly (in a step S16).

When the pulse width Thmp is not longer than 0.25T (No in the step S4), since it is thus low-speed recording operation less than the recording speed for which the conventional scheme may not match, multi-pulse sequence according to the above-described seventh embodiment (as shown in FIG. 5B) is chosen (in a step S17). Then, respective pulse widths Thtop, Thmp, Tcend, Te, respective power Ph, Pc, Pe are newly set (in a step S18), and recording operation is performed therewith (in the step S16).

As the above-mentioned phase-change disk 201, any a phase-change disk such as a CD-RW, a DVD-RW, or the like which is designed for a predetermined recording speed range may be applied.

FIG. 19 shows the information recording device embodying the scheme according to the above-mentioned eighth embodiment of the present invention.

The rotation control mechanism 209 includes the spindle motor 205 which carries out rotation driving of the phase-change optical disk 201. The optical head 203 is provided with the semiconductor laser 204, object lens, and so forth, carries out condensing and applying the laser light onto the phase-change optical disk 201, and is movable (seek operation) along disk radius direction. An actuator control mechanism 210 is connected to an object lens drive and an outputting system of the optical head 203. A wobble detection part 212 includes the programmable BPF 211 and is connected to the above-mentioned actuator control mechanism 210. An address demodulation circuit 213 demodulates addresses from the detected wobble signal in the wobble detection part 212. With this address demodulation circuit 213, a recording clock generation part 215 including a PLL synthesizer circuit 214 is connected. Further, a driving controller 216 is connected to the PLL synthesizer circuit 214.

The rotation control mechanism 209, actuator control mechanism 210, wobble detection part 212, and address demodulation circuit 213 are also connected to the driving controller 216 connected to the system controller 217.

Moreover, an EFM encoder 218 and a recording pulse sequence control part 208 are connected to the system controller 217. This recording pulse sequence control part 208 includes a top heating pulse generation part 219 generating a heating pulse control signal including the top heating part, and a first, second heating pulse generation part 220 which generates the heating pulse control signal including the following heating/cooling parts, an erase pulse generation part 221 which generates an erase pulse control signal for erase pulse, an edge selector 223, and a pulse number control part 224.

In the output side of this recording pulse sequence control part 208, the LD driver part 202 is connected which controls switching of the respective driving current sources 206 on the heating power Ph, cooling power Pc, erase power Pe so as to drive the semiconductor laser LD 204 in the optical head 203 with the relevant power. Although not shown in the figure, a mark length counter is also provided in the recording pulse sequence control part 208 for counting for the mark data length based on the output of the EFM encoder 218.

In such a configuration., in order to perform recording onto the phase-change optical disk 201, address demodulation is performed from the wobble signal, obtained through separation detection with the programmable BPF 211 from the push pull signal acquired from the optical head 203, after controlling the rotation speed of the spindle motor 205 by the rotation control mechanism 209 into the recording line speed corresponding to the target recording speed. Also, the PLL synthesizer circuit 214 generates the recording channel clock signal.

Next, in order to generate the recording pulse (multi-pulse) sequences by the semiconductor laser LD 204, the recording channel clock signal and EFM data which is record information are input into the recording pulse sequence control part 208, and the heating pulse control signal containing the top heating pulse is generated by the heating pulse generation part 219 in the record pulse sequence control part 208. Further, the first, second heating pulse-pulse generation part 220 generates the heating multi-pulse control signal for the heating/cooling pulses following to the top heating pulse every period of the recording channel clock signal. Then, the erase pulse generation part 221 generates the erase pulse control signal which is the erase portion. Then, through the switching of the driving current source 206 set to provide the respective one of the above-mentioned Ph, Pe and Pc in the LD driver part 202, the LD light-emission waveform of recording pulse sequence can be obtained.

In this information recording device shown in FIG. 19, a multi-stage pulse edge generation part 223 is provided in each of the top heating pulse generation part 219 and first, second heating pulse series generation part 220 which has the resolution of 1/20 of the recording channel clock period. Thereby, by using edge pulses selected by the system controller 217 after being input into the selector (multiplexer) 222, the top heating pulse control signal and first, second heating multi-pulse control signal are generated. A multi-stage delay circuit is included in the pulse edge generation part 223 and may be formed of gate delay devices, ring oscillator and a PLL circuit having high resolution.

Thus, the multi-pulse sequence synchronized with the recording channel clock signal is created by the thus-generated heating pulses, and, the pulse width of cooling pulses are also simultaneously determined by duty with respect to the heating multi-pulse width.

Similarly, edge pulses generated in the multi-stage delay circuit of the last cooling pulse generation part provided individually are input into the edge selector, and thus the rear edge of the last cooling pulse is defined by the edge pulse chosen by the system controller 217. Instead, it is also possible that, in the erase pulse generation part 221, edge pulses generated in another multi-stage delay circuit are selected by the edge selector 222, and thereby, a rear edge of a predetermined last cooling pulse is defined.

Various configurations may also be applied for generating these control pulses together with the driving current source 206.

The whole recording multi-pulse sequence is thus created as a pulse group.

In this recording pulse sequence control part 208, the pulse number control part 224 controls the number of pulses on the heating multi-pulse control signal according to the EFM signal and the recording channel clock period T. Thereby, from each of the rising edge and decaying edge of the recording channel clock signal, the heating multi-pulse signal is generated for the predetermined pulse width set by the edge selector. At this time, as a result of the system controller 217 selecting one or both edges of the recording channel clock pulse, whether the control signal for one pair of heating/cooling pulses be generated or the control signal for two pairs of heating/cooling pulses be generated is determined for each clock pulse.

As an alternative configuration of the recording pulse sequence control part, a recording multiplied clock signal is generated through two-time multiplying of the recording channel clock signal, and, therefrom, edge pulses are generated by using a multi-stage delay circuit. Then, selection is made therefrom, and, thus, front and rear edges are defined by an edge selector. Thereby, two pairs of heating/cooling pulses are generated every 1T increase in the recording channel clock signal. In this configuration, the substantial operation frequency of recording pulse sequence control part is set double. However, as the recording channel clock frequency itself is lowered in such a low-speed recording, the operation frequency does not increase much substantially. According to this configuration, further lower-speed recording operation can be attained without increasing the number of types of information recording medium.

According to the related art, a recording device for a phase-change optical disk 201 like a CD-RW or a DVD-RW has a recording pulse sequence control part which additionally generates a pair of heating/cooling pulses every increase of 1T of mark data length for a predetermined recording speed range. Then, setting is made on the top heating pulse width Thtop, heating multi-pulse width Thmp which follows thereto, the pulse width Tcend on the last cooling pulse, and each light-emission power as being the optimum values according to the recording speed selected from the predetermined record speed range.

According to the present invention in the eighth embodiment, in addition to the above-described configuration according to the related art, switching of the recording pulse sequence control part 208 is made so as to cause it to additionally generate two pair of heating/cooling pulses every 1T increase of the mark data length, when the selected recording speed becomes less than the predetermined recording speed range. Thereby, it is possible to establish the information recording device having performance on a wider range of recording speed. For example, on a DVD-RW medium corresponding to the recording speed in a range between 2 and 5 times, low-speed recording such as in a range between 1 and 5 times can be made. Similarly, on a C-RW medium corresponding to the recording speed in a range between 4 and 10 times, low-speed recording such as in a range between 1 and 10 times can be made. Moreover, it is also possible to realize further improved recording by tuning the information recording medium to be suited to the recording scheme according to the eighth embodiment of the present invention.

In addition, the setting values on the top heating pulse width, pulse width of the last cooling pulse and so forth shown above are merely typical value, and, actually, should be optimized according to recording material, medium phase configuration, etc. Moreover, since the total length of record waveform and formed mark length may differ according to difference in recording modulation scheme, diameter of optical spot of laser light, and recording density, the correspondence between the mark length and recording waveform may be altered appropriately for a particular case.

Figure 20:
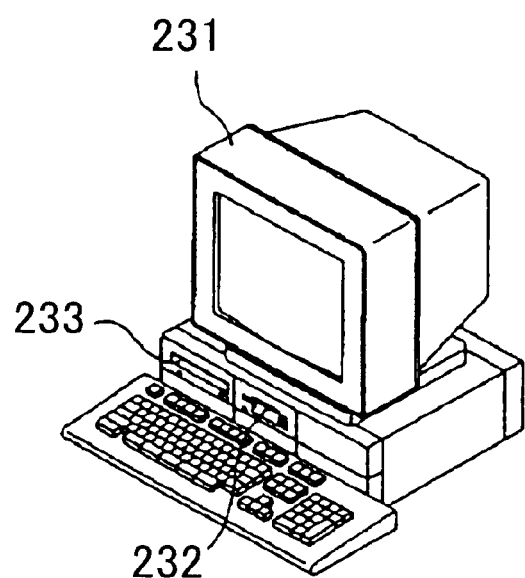
FIG. 20 illustrates a personal computer in which the information recording device shown in FIG. 19 may be applied.

FIG. 20 shows an example where the configuration shown in FIG. 19 is applied with a personal computer 231 as an information processing device. In this example, other than a 3.5-inch floppy disk drive 232, the information recording device 233 such as that shown in FIG. 19 is built in the personal computer 231 as a DVD-RW drive.

According to the personal computer 231 having the configuration shown in FIG. 20, as the above-described information recording device 233 is included therein, it is possible to secure a sufficient heating time and cooling time by the pulse control scheme of simple configuration, and, also, predetermined mark lengths can be created without increasing operation speed of the light source driving unit. Accordingly, it is possible to achieve low-speed recording of recording speed lower than the conventional phase-change optical disk recording speed range, and, thereby, a very useful peripheral information storage device can be provided thereby.

Further, the present invention is not limited to the above-described embodiments, and variations and modifications may be made without departing from the scope of the present invention.

The present application is based on Japanese priority applications. Nos. 2001-113459, 2001-135211 and 2001-287272, filed on Apr. 12, 2001, May 2, 2001 and Sep. 20, 2001, respectively, the entire contents of which are hereby incorporated by reference.

What is claimed is:

1. An information recording method comprising the steps of:

a) converting an input bit sequence with predetermined bit periods T into a corresponding light-emission waveform; and
b) applying a beam with the thus-obtained light-emission waveform onto a recording medium so as to form record marks thereon, wherein:
the light-emission waveform comprises a heating pulse for heating the recording medium for an interval tw and a cooling pulse for cooling the recording medium for an interval tc; and
the intervals tw and tc on the heating/cooling pulses satisfy the following requirement in case the heating/cooling pulses occur alternately with repetition:

$1.5T \leq tw+tc \leq 3T.$

2. The method as claimed in claim 1, wherein:
the heating/cooling pulses satisfy the following formula except the top ones:

$1.5T \leq tw+tc \leq 2T.$

3. The method as claimed in claim 2, wherein:
the heating/cooling pulses further satisfy the requirement such that the value of tw+tc be one of 1.5T, 1.75T and 2T.

4. The method as claimed in claim 1, wherein:
the heating/cooling pulses further satisfy the following formula:

$0.2 \leq tw/(tw+tc) \leq 0.8.$

5. The method as claimed in claim 3, wherein:
the heating/cooling pulses further satisfy the requirement such that the value of tw+tc be one of 1.5T, 1.75T and 2T.

6. The method as claimed in claim 1, wherein the light-emission waveform is configured such that:
a total length of the heating/cooling pulses occurring alternately with successive repetition thereof falls within a range between (nT−1.5T) and (nT+0.5T) for recording the record mark on the recording medium having the length of nT where n denotes an integer more than 2.

7. The method as claimed in claim 1, wherein a beam with a power Pe is applied to the recording medium during an interval during which no record mark is recorded thereonto, where:

$Pb<Pe<Pw$ where:
Pw denotes the power of heating pulse; and
Pb denotes the power of cooling pulse.

8. The method as claimed in claim 1, wherein:
the light-emission waveform is configured on each predetermined mark length such that the top heating/cooling pulses and last heating/cooling pulses are fixed in their intervals regardless of the mark length.

9. The method as claimed in claim 8, wherein:
the light-emission waveform is configured on each predetermined mark length such that the top heating/cooling pulses and last heating/cooling pulses are adjustable in their intervals according to the a property of the recording medium.

10. The method as claimed in claim 1 wherein the recording medium comprises a phase-change recording medium.

11. An information recording device comprising:
a unit converting an input bit sequence with predetermined bit periods T into a corresponding light-emission waveform; and
a unit applying a beam with the thus-obtained light-emission waveform onto a recording medium so as to record a record mark thereon, wherein:
the light-emission waveform comprises a heating pulse for heating the recording medium for an interval tw and a cooling pulse for cooling the recording medium for an interval tc; and
the intervals tw and tc on the heating/cooling pulses satisfy the following requirement in case the heating/cooling pulses occur alternately with successive repetition:

$1.5T \leq tw+tc \leq 3T.$

12. The device as claimed in claim 11, wherein:
the heating/cooling pulses satisfy the following formula except the top ones:

$1.5T \leq tw+tc \leq 2T.$

13. The device as claimed in claim 12, wherein:
the heating/cooling pulses further satisfy the requirement such that the value of tw+tc be one of 1.5T, 1.75T and 2T.

14. The device as claimed in claim 11, wherein:
the heating/cooling pulses further satisfy the following formula:

$0.2 \leq tw/(tw+tc) \leq 0.8.$

15. The device as claimed in claim 13, wherein:
the heating/cooling pulses further satisfy the requirement such that the value of tw+tc be one of 1.5T, 1.75T and 2T.

16. The device as claimed in claim 11, wherein the light-emission waveform is configured such that:
a total length of the heating/cooling pulses occurring alternately with successive repetition thereof falls within a range between (nT−1.5T) and (nT+0.5T) for recording the record mark on the recording medium having the length of nT where n denotes an integer more than 2.

17. The device as claimed in claim 11, wherein a beam with a power Pe is applied to the recording medium during an interval during which no record mark is recorded thereonto, where:

$Pb<Pe<Pw$ where:
Pw denotes the power of heating pulse; and
Pb denotes the power of cooling pulse.

18. The device as claimed in claim 11, wherein:
the light-emission waveform is configured on each predetermined mark length such that the top heating/cooling pulses and last heating/cooling pulses are fixed in their intervals regardless of the mark length.

19. The device as claimed in claim 18, wherein:
the light-emission waveform is configured on each predetermined mark length such that the top heating/ cooling pulses and last heating/cooling pulses are adjustable in their intervals according to the a property of the recording medium.

20. The device as claimed in claim 11 wherein the recording medium comprises a phase-change recording medium.

21. An information recording method comprising the steps of:
   a) creating a light-emission waveform; according to input data and
   b) applying a beam with the thus-obtained light-emission waveform onto a recording medium in timing of recording channel clock signal having a predetermined period T so as to form a record mark therein,
   wherein:
      the light-emission waveform comprises a heating pulse for heating the recording medium and a cooling pulse for cooling the recording medium;
      the single heating pulse and single cooling pulse are added for every increase in mark data length of 2T; and
      the record mark length is adjusted by controlling of light-emission power level of an erase pulse applied to the recording medium subsequent to the last cooling pulse for the relevant record mark.

22. The method as claimed in claim 21, wherein:
a difference of 1T in mark data length is created between record marks having the same number of heating/cooling pulses by controlling the pulse width of the last cooling pulse and light-emission power level of the erase pulse.

23. An information recording method comprising the steps of:
   a) creating a light-emission waveform according to input data; and
   b) applying a beam with the thus-obtained light-emission waveform onto a recording medium in timing of recording channel clock signal having a predetermined period T so as to form a record mark therein,
   wherein:
      the light-emission waveform comprises a heating pulse for heating the recording medium and a cooling pulse for cooling the recording medium;
      the single heating pulse and single cooling pulse are added for every increase in mark data length of 2T; and
      a beam is applied to the recording medium for creating a space subsequent to the record mark at a first erase power, and an erase pulse of light emission is applied to the recording medium subsequent to the last cooling pulse for the relevant record mark,
   wherein two different mark data lengths are created by the same number of heating/cooling pulses as a result of differing the light-emission level of the erase pulse so that:
      for one of the two mark data length, the erase pulse has a second erase power higher than the first erase power while, for the other of the two mark data length, the erase pulse has a third erase power lower than the first erase power.

24. The method as claimed in claim 23, wherein:
said one of the two mark data length is shorter than the other thereof.

25. The method as claimed in claim 23, wherein:
the pulse width Tcend2 of the last cooling pulse followed by the erase pulse with the second erase power is shorter than the pulse width Tcend3 of the last cooling pulse followed by the erase pulse with the erase power on the third erase power.

26. The method as claimed in claim 25, wherein the following formula is further satisfied:

$$0.3T \leq Tcend3 - Tcend2 \leq 0.7T.$$

27. The method as claimed in claim 25, wherein setting information concerning the pulse width values Tcend2 and Tcend3 of last cooling pulse is previously recorded in the recording medium as pre-format information.

28. The method as claimed in claim 25, wherein setting information concerning the pulse width values Tcend2 and Tcend3 of last cooling pulse is previously stored in an information recording device which performs information recording according to said method.

29. The method as claimed in claim 25, wherein the pulse widths Tcend2 and Tcend3 of last cooling pulse are newly set in case where recording is made onto the recording medium having a preset recordable speed range, at a recording speed exceeding the recordable speed range.

30. The method as claimed in claim 25, wherein the pulse widths Tcend2 and Tcend3 of last cooling pulse are newly set and applied in case where the pulse width of each heating pulse following a top heating pulse exceeds approximately 0.55T.

31. The method as claimed in claim 25, wherein the ratios $\epsilon 2$ and $\epsilon 3$ on erase power are newly set and applied in case where the pulse width of each heating pulse following a top heating pulse exceeds approximately 0.55T.

32. The method as claimed in claim 23, wherein the following formulas are satisfied:

$$\epsilon 1 + 0.05 < \epsilon 2 < \epsilon 1 + 0.20$$

$$\epsilon 1 - 0.20 < \epsilon 3 < \epsilon 1 - 0.05$$

where:
   $\epsilon 1 = Pe1/Ph$
   $\epsilon 2 = Pe2/Ph$
   $\epsilon 3 = Pe3/Ph$
where:
   Ph denotes the heating power of each heating pulse;
   Pe1 denotes the first erase power;
   Pe2 denotes the second erase power; and
   Pe2 denotes the third erase power.

33. The method as claimed in claim 32, wherein the following formula is further satisfied:

$$0.3T \leq Tcend3 - Tcend2 \leq 0.7T$$

where:
   Tcend2 denotes the pulse width of the last cooling pulse followed by erase pulse with the second erase power; and
   Tcend3 denotes the pulse width of the last cooling pulse followed by the erase pulse with the third erase power.

34. The method as claimed in claim 32, wherein setting information concerning the ratios $\epsilon 2$ and $\epsilon 3$ on erase power is previously recorded in the recording medium as pre-format information.

35. The method as claimed in claim 32, wherein setting information concerning the ratios $\epsilon 2$ and $\epsilon 3$ on erase power is previously stored in an information recording device which performs information recording according to said method.

36. The method as claimed in claim 32, wherein the ratios $\epsilon 2$ and $\epsilon 3$ on erase power are newly set in case where recording is made onto the recording medium having a preset recordable speed range, at a recording speed exceeding the recordable speed range.

37. An information recording device comprising:
a unit creating a light-emission waveform according to input data; and
a unit applying a beam with the thus-obtained light-emission waveform onto a recording medium in timing of recording channel clock signal having a predetermined period T so as to form a record mark therein, wherein:
the light-emission waveform comprises a heating pulse for heating the recording medium and a cooling pulse for cooling the recording medium;
the single heating pulse and single cooling pulse are added for every increase in mark data length of 2T; and
the record mark length is adjusted by controlling of light-emission power level of an erase pulse applied to the recording medium subsequent to the last cooling pulse for the relevant record mark.

38. The device as claimed in claim 37, wherein:
a beam is applied to the recording medium at a first erase power for creating a space subsequent to the recording mark, and an erase pulse is applied to the recording medium subsequent to the last cooling pulse for the relevant record mark,
wherein two different mark data lengths are created by the same number of heating/cooling pulses as a result of differing the light-emission level of the erase pulse so that:
for one of the two mark data length, the erase pulse has a second erase power higher than the first erase power while, for the other of the two mark data length, the erase pulse has a third erase power lower than the first erase power.

39. The device as claimed in claim 38, wherein the following formulas are satisfied:

$$\epsilon 1+0.05<\epsilon 2<\epsilon 1+0.20$$

$$\epsilon 1-0.20<\epsilon 3<\epsilon 1-0.05$$

where:
$\epsilon 1=Pe1/Ph$
$\epsilon 2=Pe2/Ph$
$\epsilon 3=Pe3/Ph$
where:
Ph denotes the heating power of each heating pulse;
Pe1 denotes the first erase power;
Pe2 denotes the second erase power; and
Pe2 denotes the third erase power.

40. The device as claimed in claim 39, wherein the following formula is further satisfied:

$$0.3T \leq Tcend3-Tcend2 \leq 0.7T$$

where:
Tcend2 denotes the pulse width of the last cooling pulse followed by the erase pulse with the second erase power; and
Tcend3 denotes the pulse width of the last cooling pulse followed by the erase pulse with the third erase power.

41. The device as claimed in claim 39, wherein setting information concerning the ratios $\epsilon 2$ and $\epsilon 3$ on erase power is previously recorded in the recording medium as pre-format information.

42. The device as claimed in claim 39, wherein setting information concerning the ratios $\epsilon 2$ and $\epsilon 3$ on erase power is previously stored in an information storage device.

43. The method as claimed in claim 42, wherein the setting information stored in said storage device can be updated arbitrarily.

44. The device as claimed in claim 39, wherein the ratios $\epsilon 2$ and $\epsilon 3$ on erase power are newly set and applied in case where recording is made onto the recording medium having a preset recordable speed range, at a recording speed exceeding the recordable speed range.

45. The device as claimed in claim 44, wherein:
within the predetermined recordable speed range, a single heating pulse and a single cooling pulse are added upon increase in mark data length by 1T.

46. The device as claimed in claim 39, wherein the ratios $\epsilon 2$ and $\epsilon 3$ on erase power are newly set and applied in case where the pulse width of each heating pulse following a top heating pulse exceeds approximately 0.55T.

47. The device as claimed in claim 37, wherein an EFM family modulation scheme is used for creating record mark data.

48. The device as claimed in claim 37, wherein:
the pulse width Tcend2 of the last cooling pulse followed by the erase pulse with the second erase power is shorter than the pulse width Tcend3 of the last cooling pulse followed by the erase pulse with the third erase power.

49. The device as claimed in claim 48, wherein the following formula is further satisfied:

$$0.3T \leq Tcend3-Tcend2 \leq 0.7T.$$

50. The device as claimed in claim 48, wherein setting information concerning the pulse width values Tcend2 and Tcend3 of last cooling pulse is previously recorded in the recording medium as pre-format information.

51. The device as claimed in claim 48, wherein setting information concerning the pulse width values Tcend2 and Tcend3 of last cooling pulse is previously stored in an information storage device.

52. The method as claimed in claim 51, wherein the setting information stored in said storage device can be updated arbitrarily.

53. The device as claimed in claim 48, wherein the pulse widths Tcend2 and Tcend3 of last cooling pulse are newly set and applied in case where recording is made onto the recording medium having a preset recordable speed range, at a recording speed exceeding the recordable speed range.

54. The device as claimed in claim 53, wherein:
within the predetermined recordable speed range, a single heating pulse and a single cooling pulse are added upon increase in mark data length by 1T.

55. The device as claimed in claim 48, wherein the pulse widths Tcend2 and Tcend3 of last cooling pulse are newly set and applied in case where the pulse width of each heating pulse following a top heating pulse exceeds approximately 0.55T.

56. An information processing device comprising the information recording device claimed in claim 37.

57. An information recording method comprising the steps of:
a) creating a light-emission waveform according to input data; and
b) applying a beam with the thus-obtained light-emission waveform onto a recording medium in timing of recording channel clock signal having a predetermined period T so as to form a record mark therein, wherein:

the light-emission waveform comprises a heating pulse for heating the recording medium and a cooling pulse for cooling the recording medium;

two sets each comprising single heating pulse and single cooling pulse are added for every increase in mark data length of 1T.

58. The device as claimed in claim 57, wherein:

the recording medium has a predetermined recordable speed range previously set;

single heating pulse and single cooling pulse are added for every increase in mark data length by 1T, and the pulse width of each heating pulse is adjusted according to a recording speed applied within the predetermined recordable range; and two sets each comprising single heating pulse and single cooling pulse are added for every increase in mark data length by 1T in case of recording in a recording speed lower than the predetermined recordable speed range where the pulse width of each heating pulse becomes smaller than a predetermined pulse width.

59. The method as claimed in claim 58, wherein the predetermined pulse width is 0.25T.

60. An information recording device comprising:

a unit creating a light-emission waveform according to input data; and a unit applying a beam with the thus-obtained light-emission waveform onto a recording medium in timing of recording channel clock signal having a predetermined period T so as to form a record mark therein, wherein:

the light-emission waveform comprises a heating pulse for heating the recording medium and a cooling pulse for cooling the recording medium;

two sets each comprising single heating pulse and single cooling pulses are added for every increase in mark data length of 1T.

61. The device as claimed in claim 60, wherein:

said unit of creating a light-emission waveform according to input data controls the number of pulses of the light-emission waveform according to setting information indicating a recording speed by which switching is made so that two sets each comprising single heating pulse and signal cooling pulse are added for every increase in mark data length by 1T, the setting information being previously recorded in the recording medium as pre-format information.

62. The device as claimed in claim 60, wherein:

said unit of creating a light-emission waveform according to input data controls the number of pulses of the light-emission waveform according to setting information indicating a recording speed by which switching is made so that two sets each comprising single heating pulse and signal cooling pulse are added for every increase in mark data length by 1T, the setting information being previously stored in a storage device.

63. The device as claimed in claim 60, wherein:

the recording medium has a predetermined recordable speed range previously set;

single heating pulse and single cooling pulse are added for every increase in mark data length by 1T, and the pulse width of each heating pulse is adjusted according to a recording speed applied within the predetermined recordable range; and switching is made such that two sets each comprising single heating pulse and single cooling pulse are added for every increase in mark data length by 1T in case of recording in a recording speed lower than the predetermined recordable speed range.

* * * * *